(12) United States Patent
Kataria et al.

(10) Patent No.: US 11,334,564 B2
(45) Date of Patent: May 17, 2022

(54) EXPANDING SEARCH QUERIES

(71) Applicant: Microsoft Technology Licensing, LLC, Redmond, WA (US)

(72) Inventors: Saurabh Kataria, Newark, CA (US); Ada Cheuk Ying Yu, Santa Clara, CA (US); Dhruv Arya, Sunnyvale, CA (US); Swanand Wakankar, Campbell, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 153 days.

(21) Appl. No.: 16/942,511

(22) Filed: Jul. 29, 2020

(65) Prior Publication Data
US 2020/0356554 A1 Nov. 12, 2020

Related U.S. Application Data

(63) Continuation of application No. 15/907,476, filed on Feb. 28, 2018, now Pat. No. 10,769,141.
(Continued)

(51) Int. Cl.
*G06F 16/2452* (2019.01)
*G06F 16/9537* (2019.01)
(Continued)

(52) U.S. Cl.
CPC ........ *G06F 16/2452* (2019.01); *G06F 16/248* (2019.01); *G06F 16/2425* (2019.01);
(Continued)

(58) Field of Classification Search
CPC ............. G06F 16/2452; G06F 16/2425; G06F 16/9535; G06F 16/9537; G06F 16/24578; G06F 16/248; G06Q 10/1053
(Continued)

(56) References Cited

U.S. PATENT DOCUMENTS 6,741,993 B1  5/2004  Zitaner et al.
8,050,959 B1  11/2011 Erdman et al.
(Continued)

OTHER PUBLICATIONS

"U.S. Appl. No. 15/907,476, Examiner Interview Summary dated Apr. 7, 2020", 4 pgs.
(Continued)

*Primary Examiner* — Evan Aspinwall
(74) *Attorney, Agent, or Firm* — Schwegman Lundberg & Woessner, P.A.

(57) ABSTRACT

Disclosed are systems, methods, and non-transitory computer-readable media for expanding search queries. A search system executes a search query based on a search term and the geographic indicator. In response to determining that a number of the search results is less than a threshold number, the search system determines, based on historical search logs from other users in the first geographic region, a likelihood value indicating a likelihood that the other users in the first geographic region expanded the geographic region of their search queries. The search system compares the likelihood value to a threshold likelihood value, and determines, based on the comparison, that the likelihood value meets or exceeds the threshold likelihood value. The search system then executes an expanded search based on the search term and an expanded geographic indicator that encompasses the first geographic region.

20 Claims, 14 Drawing Sheets

Related U.S. Application Data

(60) Provisional application No. 62/578,100, filed on Oct. 27, 2017.

(51) Int. Cl.

| | | |
|---|---|---|
| *G06F 16/242* | (2019.01) | |
| *G06F 16/9535* | (2019.01) | |
| *G06F 16/2457* | (2019.01) | |
| *G06F 16/248* | (2019.01) | |
| *G06Q 10/10* | (2012.01) | |
| *G06N 3/04* | (2006.01) | |

(52) U.S. Cl.
CPC .... *G06F 16/24578* (2019.01); *G06F 16/9535* (2019.01); *G06F 16/9537* (2019.01); *G06Q 10/1053* (2013.01); *G06N 3/04* (2013.01)

(58) Field of Classification Search
USPC .......................................................... 707/724
See application file for complete search history.

(56) References Cited

U.S. PATENT DOCUMENTS

| | | | |
|---|---|---|---|
| 9,146,939 B1* | 9/2015 | Zhdanovich | G06F 16/9535 |
| 10,157,291 B1 | 12/2018 | Kenthapadi et al. | |
| 10,719,626 B2 | 7/2020 | Chen | |
| 10,747,793 B2 | 8/2020 | Kataria et al. | |
| 10,769,141 B2 | 9/2020 | Kataria et al. | |
| 2002/0091715 A1 | 7/2002 | Coady | |
| 2005/0234879 A1 | 10/2005 | Zeng et al. | |
| 2005/0234972 A1 | 10/2005 | Zeng et al. | |
| 2005/0257148 A1 | 11/2005 | Goodman et al. | |
| 2005/0261956 A1 | 11/2005 | Kato | |
| 2007/0038602 A1 | 2/2007 | Weyand et al. | |
| 2007/0203720 A1 | 8/2007 | Singh et al. | |
| 2008/0201197 A1 | 8/2008 | Orttung et al. | |
| 2008/0243783 A1* | 10/2008 | Santi | G06F 16/9535 |
| 2011/0302162 A1 | 12/2011 | Xiao | |
| 2014/0074555 A1 | 3/2014 | Tenhoeve et al. | |
| 2014/0244335 A1 | 8/2014 | Baldwin et al. | |
| 2014/0358809 A1 | 12/2014 | Gupta et al. | |
| 2015/0095105 A1 | 4/2015 | Fitts | |
| 2015/0127565 A1 | 5/2015 | Chevalier et al. | |
| 2015/0128287 A1 | 5/2015 | Lafever et al. | |
| 2015/0193719 A1 | 7/2015 | Than et al. | |
| 2015/0278366 A1 | 10/2015 | Pilpel et al. | |
| 2015/0379445 A1 | 12/2015 | Wang et al. | |
| 2016/0026727 A1 | 1/2016 | Bar-yossef et al. | |
| 2016/0196511 A1 | 7/2016 | Anisingaraju et al. | |
| 2017/0116552 A1 | 4/2017 | Deodhar et al. | |
| 2018/0089196 A1 | 3/2018 | Kenthapadi et al. | |
| 2019/0019116 A1 | 1/2019 | Haririnia et al. | |
| 2019/0080246 A1 | 3/2019 | Sun et al. | |
| 2019/0102710 A1 | 4/2019 | Predescu et al. | |
| 2019/0102720 A1 | 4/2019 | Jennings et al. | |
| 2019/0114593 A1 | 4/2019 | Champaneria | |
| 2019/0129995 A1 | 5/2019 | Kataria et al. | |
| 2019/0129998 A1 | 5/2019 | Kataria et al. | |
| 2019/0130023 A1 | 5/2019 | Kataria et al. | |
| 2019/0294694 A1 | 9/2019 | Dash et al. | |
| 2019/0370495 A1 | 12/2019 | Chen | |
| 2019/0370496 A1 | 12/2019 | Chen | |
| 2019/0370707 A1 | 12/2019 | Liu | |

OTHER PUBLICATIONS

"U.S. Appl. No. 15/907,476, Non Final Office Action dated Feb. 19, 2020", 17 pgs.

"U.S. Appl. No. 15/907,476, Notice of Allowance dated Apr. 16, 2020", 10 pgs.

"U.S. Appl. No. 15/907,476, Notice of Allowance dated May 29, 2020", 11 pgs.

"U.S. Appl. No. 15/907,476, Response filed Apr. 1, 2020 to Non Final Office Action dated Feb. 19, 2020", 21 pgs.

"U.S. Appl. No. 15/907,496, Non Final Office Action dated Feb. 14, 2020", 9 pgs.

"U.S. Appl. No. 15/908,467, Corrected Notice of Allowability dated Jun. 2, 2020", 2 pgs.

"U.S. Appl. No. 15/908,467, Examiner Interview Summary dated Apr. 22, 2020", 3 pgs.

"U.S. Appl. No. 15/908,467, Non Final Office Action dated Feb. 25, 2020", 21 pgs.

"U.S. Appl. No. 15/908,467, Notice of Allowance dated May 8, 2020", 10 pgs.

"U.S. Appl. No. 15/908,467, Response filed Apr. 17, 2020 to Non Final Office Action dated Feb. 25, 2020", 12 pgs.

"U.S. Appl. No. 15/908,467, Supplemental Notice of Allowability dated Jun. 30, 2020", 2 pgs.

"U.S. Appl. No. 15/994,106, Examiner Interview Summary dated Mar. 20, 2020", 3 pgs.

"U.S. Appl. No. 15/994,106, Non Final Office Action dated Feb. 24, 2020", 16 pgs.

"U.S. Appl. No. 15/994,106, Notice of Allowance dated Apr. 1, 2020", 8 pgs.

"U.S. Appl. No. 15/994,106, Preliminary Amendment filed Jun. 6, 2018", 8 pgs.

"U.S. Appl. No. 15/994,106, Response filed Mar. 18, 2020 to Non Final Office Action dated Feb. 24, 2020", 12 pgs.

"Non Final Office Action Issued in U.S. Appl. No. 15/994,148", dated Aug. 31, 2020, 10 Pages.

Iraqi, et al., "Unearthing Top 3 Business Strategies using Data Mining Techniques", In Proceedings of International Journal of Computer Applications, vol. 118, Issue 22, May 2015, pp. 37-42.

* cited by examiner

EXPANDING SEARCH QUERIES

CROSS-REFERENCE TO RELATED APPLICATIONS

This application is a continuation of U.S. application Ser. No. 15/907,476, filed Feb. 28, 2018, and claims the benefit of U.S. Provisional Application No. 62/578,100, filed Oct. 27, 2017, which applications are incorporated by reference herein in their entirety.

TECHNICAL FIELD

An embodiment of the invention relates generally to search queries and, more specifically, to expanding search queries.

BACKGROUND

Current web services enable users to access a large amount of data. For example, web services that provide job listings allow users to access thousands of available job listings. As another example, a web service that provides member profiles allows a recruiter to access thousands of candidate profiles. While these types of web services provide a large amount of available data, finding relevant data can be difficult. To alleviate this issue, many systems provide search functionality that allows users to formulate search queries to identify subsets of the data that are pertinent to the requesting user. For example, these systems may allow a user to enter keywords as well as designate geographical limitations to generate a search query. While these types of search queries allow a user to target their search for relevant information, in some instances they may result in only a few or even no results. Further, a user may be uncertain on how to properly broaden their search to identify relevant data. From a user's perspective, this can be very frustrating, and may lead to the user abandoning use of the service. Accordingly, improvements are needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
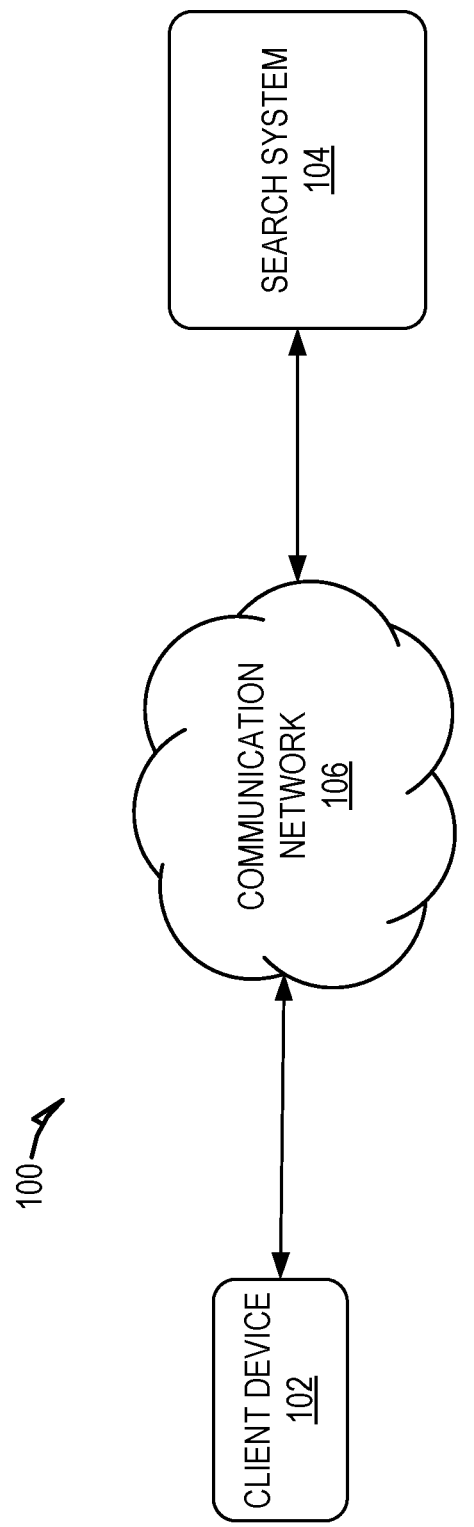
FIG. 1 shows a system configuration, wherein electronic devices communicate via a network for purposes of exchanging data, according to some example embodiments.

In the following description, for purposes of explanation, various details are set forth in order to provide a thorough understanding of various embodiments of the invention. It will be apparent, however, to one skilled in the art, that the present subject matter may be practiced without these specific details, or with slight alterations.

Reference in the specification to "one embodiment" or "an embodiment" means that a particular feature, structure or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for expanding search queries. Current search systems enable users to provide search parameters to identify relevant data. For example, search systems often enable users to enter a search term consisting of one or more keywords, which the search system uses to execute a search for relevant data. Hence, a user searching for Italian restaurants may enter a search term such as "Italian restaurants." The search system uses the search term (i.e., Italian restaurants) to identify relevant data (e.g., webpages, restaurant listing) that has been tagged with and/or includes the search term or the individual keywords (i.e., Italian, and restaurants), which are returned to the user as search results.

To further assist the user, some search systems enable users to set geographic limitations for a search. For example, a user may enter a geographic indicator that describes a geographic region in which the user would like to limit the search. Thus a user may provide the search term "Italian restaurant" and limit the search based on a geographic indicator, such as within a 10 mile radius of the user or, alternatively, within a selected city. The search system then executes a search based on the provided search term and the provided geographic indicator. For example, the search system uses the search term (e.g., Italian restaurants) and the geographic indicator (e.g., within 10 miles) to identify relevant data (e.g., webpages, restaurant listing) that have been tagged with and/or include the search term or the individual keywords (e.g., Italian, and restaurants), and are associated with location data that is within the selected geographic indicator. As a result, the user will be presented with search results that of Italian restaurants within the designated geographic location.

While using search terms and geographic indicators results in relevant search results, it also greatly reduces the number of search results that a user receives. For example, there are many more Italian restaurants than those within 10 miles of a user. Likewise, there are many more restaurants than just Italian restaurants. In some cases, the use of search terms and geographic indicators may result in very few or even no search results being returned. In this type of scenario, users have traditionally been tasked with adjusting their chosen search term and/or geographic indicator, which requires a user to guess how to modify each to receive the search results they desire.

To alleviate this issue, a search system consistent with some embodiments of the invention is configured to execute a second search query when the number of search results from a first search query are less than a specified threshold number. Further, the search system determines how to modify the original search query to receive additional search results. That is, the search system determines whether to expand the search term or the geographic indicator, and then executes the second search based on the expanded search term or expanded geographic indicator. For example, if a search query for "Italian restaurants" within 10 miles results in a low number of search results, the search system determines whether to expand the search term (i.e., Italian Restaurant) or the geographic indicator (i.e., within 10 miles), and then executes a second search query. As a result, the search system may execute a second search query for Italian restaurants within 20 miles (i.e., expanded geographic indicator), or a second search query for Italian or Greek restaurants (i.e., expanded search term) within 10 miles.

The search system determines whether to expand the search term or the geographic indicator based on historical search logs of other users. The historical search logs include records for previously submitted search queries. Each record includes the search term, geographic indicator and time stamp of the search query. The search system uses the historical search logs to calculate a likelihood value that indicates the likelihood that other users in the same geographic area would expand the geographic indicator. The search system then compares the likelihood value to a threshold likelihood value and determines to increase the geographic indicator if the likelihood value meets or exceeds the threshold likelihood value. Alternatively, the search system determines to increase the search term when the likelihood value is less than the threshold likelihood value. Other aspects of the various embodiments of the invention will be readily apparent from the description of the figures that follows.

FIG. 1 shows an example system configuration 100, wherein electronic devices communicate via a network for purposes of exchanging data, according to some example embodiments. As shown, multiple devices (i.e., a client device 102 and a search system 104) are connected to a communication network 104 and configured to communicate with each other through use of the communication network 104. The communication network 104 is any type of network, including a local area network ("LAN"), such as an intranet, a wide area network ("WAN"), such as the Internet, or any combination thereof. Further, the communication network 104 may be a public network, a private network, or a combination thereof. The communication network 104 is implemented using any number of communication links associated with one or more service providers, including one or more wired communication links, one or more wireless communication links, or any combination thereof. Additionally, the communication network 104 is configured to support the transmission of data formatted using any number of protocols.

Multiple computing devices can be connected to the communication network 104. A computing device is any type of general computing device capable of network communication with other computing devices. For example, a computing device can be a personal computing device such as a desktop or workstation, a business server, or a portable computing device, such as a laptop, smart phone, or a tablet Personal Computer (PC). A computing device can include some or all of the features, components, and peripherals of the machine 1300 shown in FIG. 13.

To facilitate communication with other computing devices, a computing device includes a communication interface configured to receive a communication, such as a request, data, etc., from another computing device in network communication with the computing device and pass the communication along to an appropriate processing module executing on the computing device. The communication interface also sends a communication (e.g., transmits data) to other computing devices in network communication with the computing device.

In the system 100, users interact with the search system 104 to execute search queries for data. For example, a user uses the client device 102 connected to the communication network 106 by direct and/or indirect communication to communicate with and utilize the functionality of the search system 104. Although the shown system 100 includes only one client device 102, this is only for ease of explanation and is not meant to be limiting. One skilled in the art would appreciate that the system 100 can include any number of client devices 102. Further, the search system 104 may concurrently accept connections from and interact with any number of client devices 102. The search system 104 supports connections from a variety of different types of client devices 102, such as desktop computers; mobile computers; mobile communication devices, e.g. mobile phones, smart phones, tablets; smart televisions; set-top boxes; and/or any other network-enabled computing devices. Hence, the client device 102 may be of varying type, capabilities, operating systems, etc.

A user interacts with the search system 104 via a client-side application installed on and executing at the client device 102. In some embodiments, the client-side application includes a search system specific component. For example, the component may be a stand-alone application, one or more application plug-ins, and/or a browser extension. However, the users may also interact with the search system 104 via a third-party application, such as a web browser, that resides on the client device 102 and is configured to communicate with the search system 104. In either case, the client-side application presents a user interface (UI) for the user to interact with the search system 104. For example, the user interacts with the search system 104 via a client-side application integrated with the file system or via a webpage displayed using a web browser application.

The search system 104 comprises one or more computing devices configured to execute user specified search queries for data and provide any resulting search results to the user. The search system 104 can be a standalone system or integrated into other systems or services, such as being integrated into a website, web service, etc. For example, the search system 104 may be integrated into a professional social networking service and used to facilitate search queries for job postings maintained by the professional social networking service. In either case, the search system 104 facilitates search queries for data, where a user using a client device 102 can enter search parameters for the search query and receive any resulting search results.

The search system 104 enables a user to execute a search query for data maintained by the search system 104 and/or data maintained by other data sources (not shown) in network communication with the search system 104. For example, the search system 104 provides the user with a search interface that enables the user to provide search parameters, such as a search term and geographic indicator. A search term comprises one or more keywords provided by the user. The geographic indicator defines a geographic area to which a user would like search results limited. For example, the geographic indicator may be defined by a radius (e.g., within 10 miles), or by a geographic region (e.g., San Jose). Accordingly, a user uses the geographic indicator to indicate that they would like search results that are associated with a geographic location that is within the geographic region.

In response to receiving a search term and a geographic indicator from a client device 102, the search system 104 executes a search query based on the search term and geographic indicator. For example, the search system 104 searches data in a data storage maintained by the search system 104 and/or web service in which the search system 104 is integrated. The search system 104 may also search data stored by other data sources. The search system 104 provides any resulting search results to the client device 102, where they are presented to the requesting user.

In instances where the search query results in few search results, the search system 104 executes a second search query based on an expanded search term or expanded geographic indicator. For example, if the search system 104 determines that a number of resulting search results is less than a threshold number of search results, the search system automatically executes a second search query based on either an expanded search term or expanded geographic indicator to provide the user with a greater number of search results.

The search system 104 determines whether to expand the search term or the geographic indicator, and then executes the second search based on the expanded search term or expanded geographic indicator. For example, if a search query for "Italian restaurants" within 10 miles results in a low number of search results, the search system 104 determines whether to expand the search term (i.e., Italian Restaurant) or the geographic indicator (i.e., within 10 miles), and then executes a second search query. As a result, the search system 104 may execute a second search query for Italian restaurants within 20 miles (i.e., expanded geographic indicator), or a second search query for Italian or Greek restaurants (i.e., expanded search term) within 10 miles.

The search system 104 determines whether to expand the search term or the geographic indicator based on historical search logs of other users. The historical search logs include records for previously submitted search queries facilitated by the search system 104. Each record includes the search term, geographic indicator and time stamp of the search query. The search system 104 uses the historical search logs to calculate a likelihood value that indicates the likelihood that other users in the same geographic area would expand the geographic indicator. The search system 104 then compares the likelihood value to a threshold likelihood value and determines to increase the geographic indicator if the likelihood value meets or exceeds the threshold likelihood value. Alternatively, the search system 104 determines to increase the search term when the likelihood value is less than the threshold likelihood value.

Figure 2:
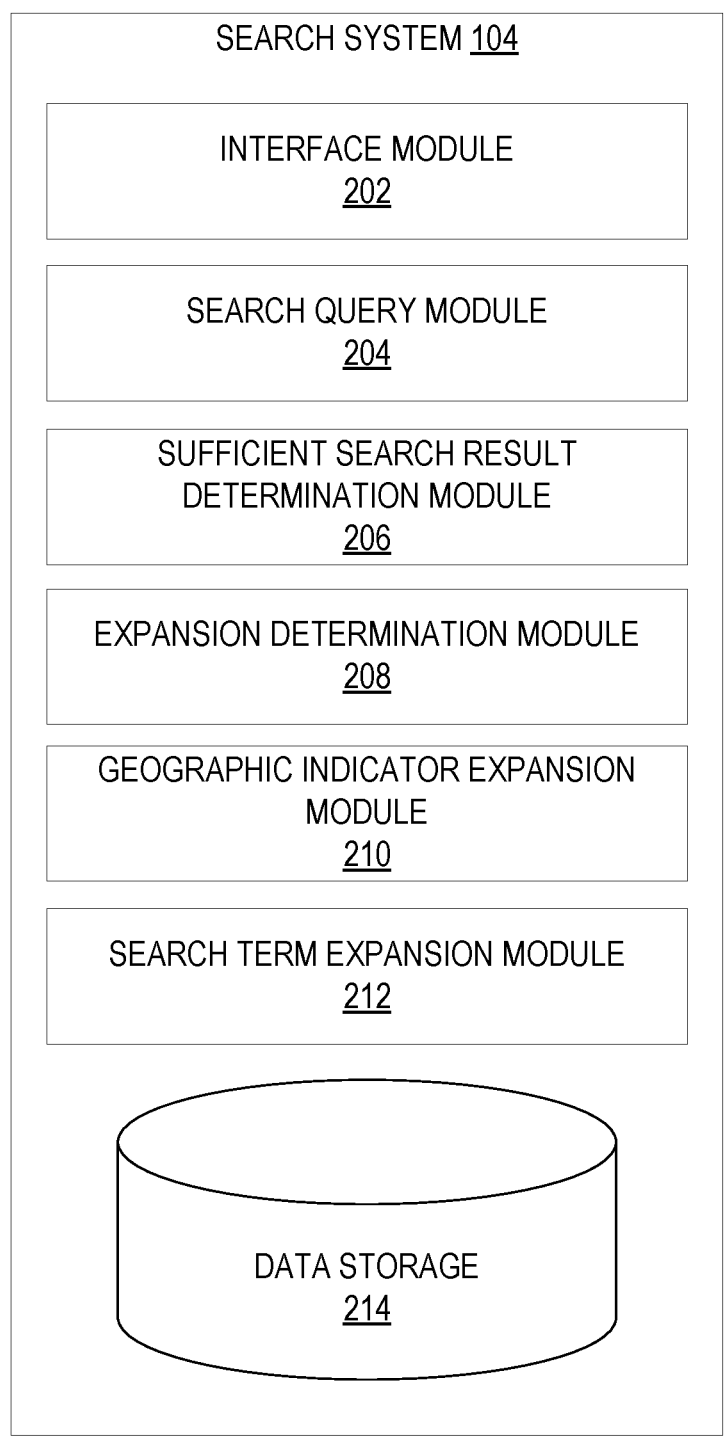
FIG. 2 is a block diagram of a search system, according to some example embodiments.

FIG. 2 is a block diagram of the search system 104, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the search system 104 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the messaging system 106 includes an interface module 202, a search query module 204, a sufficient search result determination module 206, an expansion determination module 208, a geographic indicator expansion module 210, a search term expansion module 212, and a data storage 214.

The interface module 202 provides a user's client device 102 with a search interface that enables the user to execute a search query for data as well as review the corresponding search results. For example, the interface module 202 provides data the user's client device 102, that the user's client device 102 uses to provide the search interface. Similarly, the interface module 202 receives data from the user's client device 102 to provide the functionality of the search interface.

The search interface includes user interface elements, such as buttons, text, boxes, drop down boxes, etc., that enable a user to enter search parameters to execute a search. The search parameters include a search term consisting of one or more keywords, and a geographic indicator that identifies a geographic area to which the user would like to limit the search results. This means that the user would like to receive search results that are associated with a geographic location that is within the geographic area defined by the geographic indicator. In addition to enabling the user to input search parameters, the search interface also presents the user with any search results. For example, the search interface lists the search results and enables the user to select, click, etc., the search results to access secondary information associated with the search result. For example, the search results include the titles of jobs identified as a result of the user's provided search parameters. The user may select one of the search results to access additional details about a selected job listing.

The search query module 204 executes a search query based on the search parameters provided by the user (i.e., search term and geographic indicator). For example, the search query module 204 executes a search in one or more data stores for data that includes the search term and/or the individual keyword of the search term, and includes data indicating that the data is associated with the geographic area specified by the geographic indicator. For example, the search query module 204 executes a search query of a data store including data describing restaurants for data that include the search term provided by the user (e.g., Italian restaurant), and includes data indicating that the restaurant is located within the geographic area defined by the geographic indicator (e.g., within 10 miles). As another example, the search query module 204 executes a search query of a data store including data describing job listings for data that includes the search term provided by the user (e.g., dishwasher), and included data indicating that the job is within the geographic are defined by the geographic indicator (e.g., Nome, Ak.).

The search query module 204 may execute the search query in the data storage 214 maintained by the search system 104 or a service in which the search system is implemented (e.g., a professional social networking service). Alternatively, the search query module 204 may execute the search query in data stores maintained by web servers, web services, etc., that are in network connection with the search query module 204. The search query module 204 returns any search results of the search query.

The search query module 204 also creates a record of each executed search query. The data storage 214 maintains historical search logs including records of each executed search. The search query module 204 updates the historical search logs in the data storage 214 to record each executed search query. Each record in the historical search logs includes data describing the search query, such as the search parameters used (i.e., search term and geographic indicator), the timestamp associates with the search query (i.e., the time the search query was executed), a device identifier for the client device 102 that requested the search query, etc. The historical search logs also include data indicating the search results provided to the user, as well as which search results, if any, the user selected.

The sufficient search result determination module 206, determines whether an executed search query resulted in a sufficient number of search results to be presented to the user, or if an additional search should be executed based on expanded search parameters (i.e., expanded search term or expanded geographic indicator) to gather additional search results. To accomplish this, the sufficient search result determination module 206 determines the number of search results that resulted from a search query and compares the number of search results to a threshold number of search results. If the number of search results meets or exceeds the threshold number of search results, the sufficient search result determination module 206 determines that the search query resulted in a sufficient number of search results to be presented to the user, and the interface module 202 presents the search results on the user's client device 102. Alternatively, if the number of search results is less than the threshold number of search results (i.e., the number of search results does not meet or exceed the threshold number of search results), the sufficient search result determination module 206 determines that the search query did not result in a sufficient number of search results to present to the user. As a result, an additional search will be executed based on expanded search parameters (i.e., expanded search term or expanded geographic indicator) to gather additional search results.

The expansion determination module 208, determines which search parameter should be expanded. That is, the expansion determination module 208 determines whether the search term or the geographic indicator should be expanded to execute a second search query. This is performed when the sufficient search result determination module 206 determines that the search query did not result in a sufficient number of search results to present to the user. The expansion determination module 208 determines whether to expand the search parameter or the geographic indicator based on the historical search logs. For example, the expansion determination module 208 uses the historical search logs to determine whether other users that executed searches in the same geographic area chose to expand the search term or the geographic indicator when manually entering search parameters for a second search. The expansion determination module 208 uses this data to calculate a likelihood value that indicates a likelihood that users in the geographic area will expand the geographic indicator when executing a second search. The expansion determination module 208 then compares the likelihood value to a threshold likelihood value. If the likelihood value meets or exceeds the threshold likelihood value, the expansion determination module 208 determines that the geographic indicator should be expanded for the second search. Alternatively, if the likelihood value is less than the threshold likelihood value (i.e., the likelihood value does not meet or exceed the threshold likelihood value), the expansion determination module 208 determines that the search term should be expanded for the second search. The expansion determination module 208 may perform these operations at one time based on a variety of geographic areas and store the results for later user. Alternatively, the expansion determination module 208 may perform these operations in response to a search query that resulted in a low number of search results.

In some embodiments, the expansion determination module 208 uses the historical search logs to generate a statistical model. The statistical model outputs a likelihood value based on a given input geographic location. Accordingly, the expansion determination module 208 uses the statistical model to determine the likelihood value.

The geographic indicator expansion module 210 generates an expanded geographic indicator for a second search query. For example, in response to the expansion determination module 208 determining that the geographic indicator should be expanded, the expansion determination module 208 provides the geographic indicator to the geographic indicator expansion module 210 and instructs the geographic indicator expansion module 210 to generate an expanded geographic indicator.

The expanded geographic indicator will define an expanded geographic area that is larger than the geographic area defined by the original geographic indicator. The expanded geographic area defined by the expanded geographic indicator may encompass the geographic area defined by the original geographic indicator, meaning that the expanded geographic area will include the original geographic area as well as other geographic areas not included in the original geographic area. For example, an expanded geographic indicator may increase the radius of the original geographic indicator (e.g., increase the radius from within 10 miles to within 15 miles). As another example, the expanded geographic area may increase the geographic region of the original geographic area (e.g., increase the geographic area from the city of San Francisco to the San Francisco bay area).

In either case, the geographic indicator expansion module 208 provides the expanded geographic indicator to the search query module 204. The search query module 204 then executes a second search based on the original search term and the expanded geographic indicator. The corresponding search results are presented to the user by the interface module 202. The search results may be presented with an indication that they include search results gathered using an expanded geographic indicator. The functionality of the geographic indicator expansion module 208 is explained in greater detail below in relation to FIG. 5.

The search term expansion module 212 generates an expanded search term for a second search query. For example, in response to the expansion determination module 208 determining that the search term should be expanded, the expansion determination module 208 provides the search term to the search term expansion module 212 and instructs the search term expansion module 212 to generate an expanded search term.

The expanded search term will broaden the search by, for example, adding or substituting alternate keywords or, alternatively, removing the limitations of some of the keywords in the search term. For example, the search term expansion module 212 can broaden the search term "Italian restaurant" by adding or substituting the keyword "Greek." As a result, the second search query will identify Greek restaurants in addition to the Italian restaurants identified in the first search. As another example of adding search terms, the search term expansion module 212 broadens the search term "database engineer Apple" by substituting the keyword "Google." As a result, the second search query will identify database engineering roles at Google in addition to database engineer positions at Apple identified in the first search.

The search term expansion module 212 may also broaden a search term by removing keywords to broaden the scope of the search. For example, given the original search term "database engineer Apple," the search term expansion module 212 may remove the keyword "database," resulting in the broader search term "engineer Apple." As a result, the second search will provide search results for a broader scope of engineering positions at Apple, such as software engineers, systems engineer, etc., as well as database engineers.

The search term expansion module 210 provides the expanded search term to the search query module 204. The search query module 204 then executes a second search based on the original geographic indicator and the expanded search term. The corresponding search results are presented to the user by the interface module 202. The search results may be presented with an indication that they include search results gathered using an expanded search term. The functionality of the search term expansion module 210 is explained in greater detail below in relation to FIGS. 6 and 7.

Figure 3:
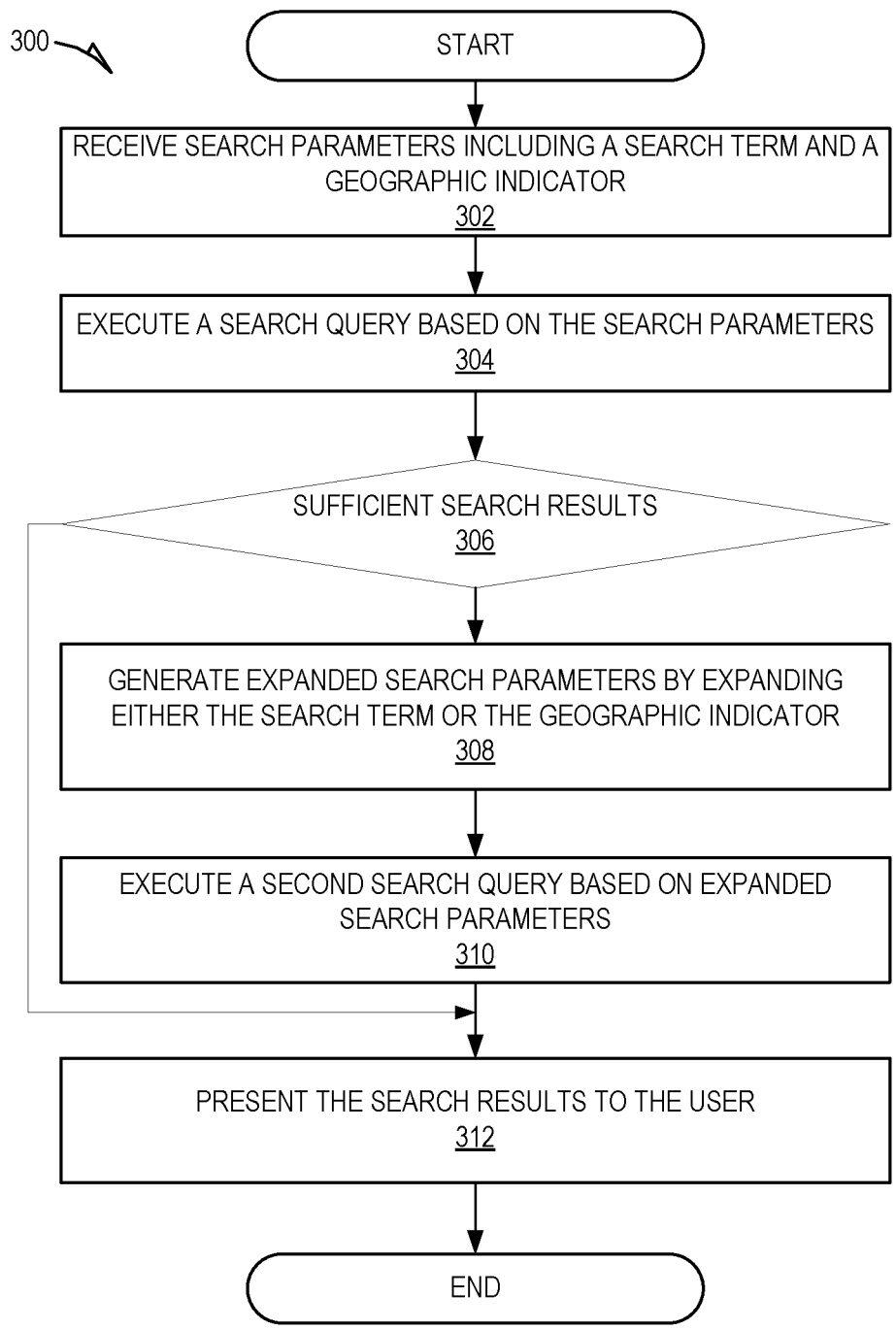
FIG. 3 is a flowchart showing an example method of executing a second search query, according to certain example embodiments.

FIG. 3 is a flowchart showing an example method 300 of executing a second search query, according to certain example embodiments. The method 300 may be embodied in computer readable instructions for execution by one or more processors such that the operations of the method 300 may be performed in part or in whole by the search system 104; accordingly, the method 300 is described below by way of example with reference thereto. However, it shall be appreciated that at least some of the operations of the method 300 may be deployed on various other hardware configurations and the method 300 is not intended to be limited to the search system 104.

At operation 302, the interface module 202 receives search parameters including a search term and a geographic indicator. The interface module 202 provides a user's client device 102 with a search interface that enables the user to execute a search query for data as well as review the corresponding search results. For example, the search interface includes user interface elements, such as buttons, text, boxes, drop down boxes, etc., that enable a user to enter search parameter to execute a search. The search parameters include a search term consisting of one or more keywords, and a geographic indicator that describes a geographic area. The user uses their client device 102 to enter the search parameters, which are then transmitted to the search system 104.

At operation 304, the search query module 204 executes a search query based on the search parameters. For example, the search query module 204 executes a search of one or more data stores for data that includes the search term and/or the individual keyword(s) of the search term, and includes data indicating that the data is associated with the geographic area specified by the geographic indicator. For example, the search query module 204 executes a search query of a data store including data describing restaurants for data that includes the search term provided by the user (e.g., Italian restaurant), and includes data indicating that the restaurant is located within the geographic area defined by the geographic indicator (e.g., within 10 miles). As another example, the search query module 204 executes a search query of a data store including data describing job listing for data that includes the search term provided by the user (e.g., dishwasher), and included data indicating that the job is within the geographic are defined by the geographic indicator (e.g., Nome, Ak.).

The search query module 204 may execute the search query in the data storage 214 maintained by the search system 104 or a service in which the search system is implemented (e.g., a professional social networking service). Alternatively, the search query module 204 may execute the search query in data stores maintained by web servers, web services, etc., that are in network connection with the search query module 204. The search query module 204 returns any search results of the search query.

At operation 306, the sufficient search result determination module 206 determines whether a number of search results returned as a result of the search query is sufficient to present to the user, or if an additional search should be executed based on expanded search parameters (i.e., expanded search term or expanded geographic indicator) to gather additional search results. To accomplish this, the sufficient search result determination module 206 determines the number of search results that resulted from a search query and compares the number of search results to a threshold number of search results. If the number of search results meets or exceeds the threshold number of search results, the sufficient search result determination module 206 determines that the search query resulted in a sufficient number of search result to be presented to the user, and at operation 312, the interface module 202 presents the search results to the user. For example, the interface module 202 causes the search results to be presented on the user's client device 102.

Alternatively, if the number of search results is less than the threshold number of search results (i.e., the number of search results does not meet or exceed the threshold number of search results), the sufficient search result determination module 206 determines that the search query did not result in a sufficient number of search results to present to the user.

As a result, at operation 308, the search system 104 generates expanded search parameters by expanding either the search term or the geographic indicator. To accomplish this, the expansion determination module 208 determines whether to expand the search term or the geographic indicator. Once the determination is made, either the geographic indicator expansion module 210 or the search term expansion module 212 generates an expanded geographic indicator or expanded search term respectively. The expanded geographic indicator or expanded search term are combined with the other original search parameters, resulting in the expanded search parameters. This operation is discussed in greater detail in relation to FIG. 4.

At operation 310, the search query module 204 executes a second search query based on the expanded search parameters, and at operation 312, the interface module 202 presents the search results to the user. The search results presented to the user include both the original search results of the search query executed based on the search parameters received from the client device 102, and the search results of the second search query executed based on the expanded search parameters.

Figure 4:
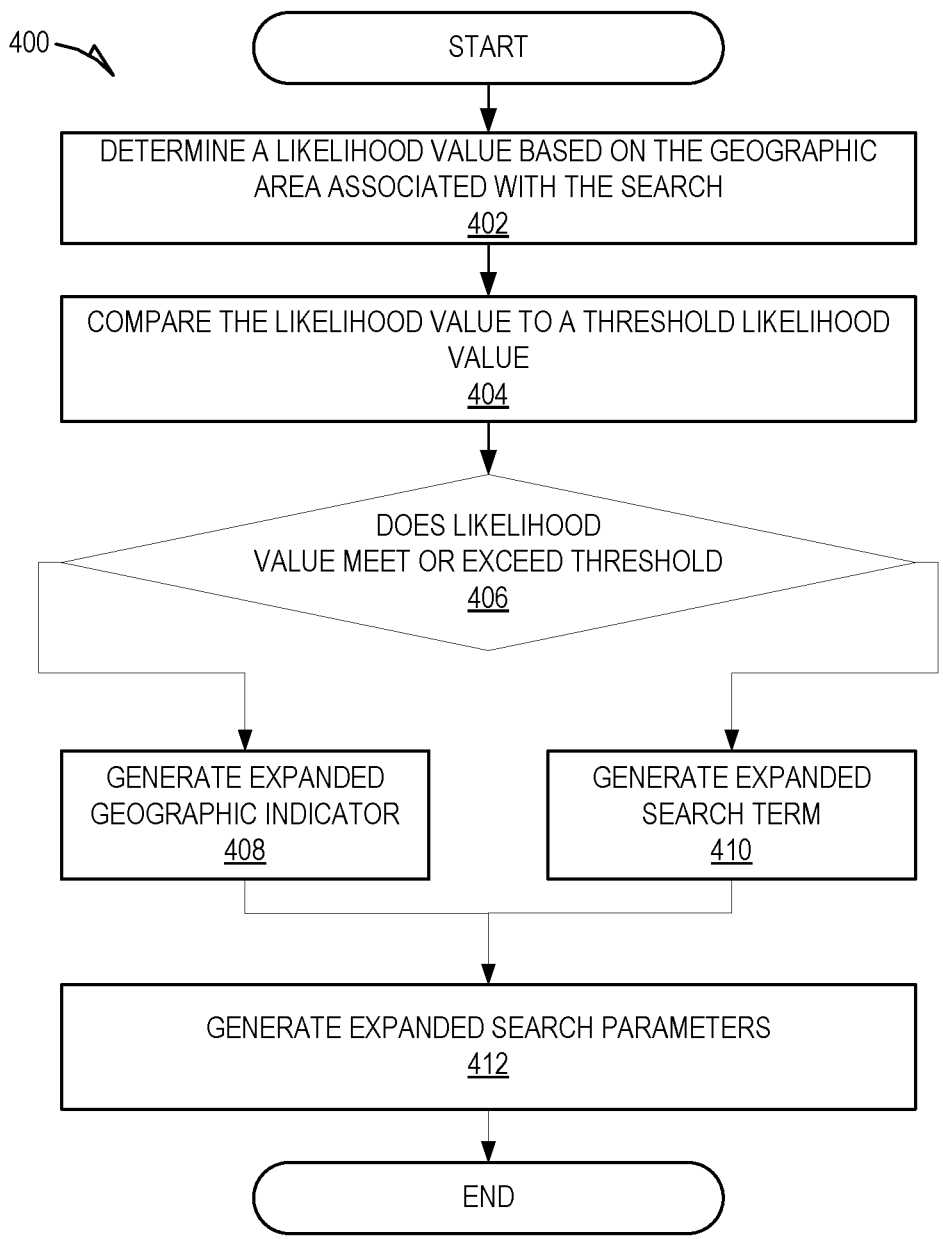
FIG. 4 is a flowchart showing an example method of determining whether to modify the geographic indicator or the search term to execute a second search query, according to certain example embodiments.

FIG. 4 is a flowchart showing an example method 400 of generating expanded search parameters by expanding either the search term or the geographic indicator, according to certain example embodiments. The method 400 may be embodied in computer readable instructions for execution by one or more processors such that the operations of the method 400 may be performed in part or in whole by the search system 104; accordingly, the method 400 is described below by way of example with reference thereto. However, it shall be appreciated that at least some of the operations of the method 400 may be deployed on various other hardware configurations and the method 400 is not intended to be limited to the search system 104.

At operation 402, the expansion determination module 208 determines a likelihood value based on the geographic area identified by the geographic indicator. The likelihood value that indicates a likelihood that users in the geographic area will expand the geographic indicator when executing a second search. The expansion determination module 208 uses historical search logs to determine whether other users that executed searches in the same geographic area chose to expand the search term or the geographic indicator when manually entering search parameters for a second search. The expansion determination module 208 then uses this data to calculate the likelihood value.

In some embodiments, the expansion determination module 208 uses the historical search logs to generate a statistical model. The statistical model outputs a likelihood value based on a given input geographic location. Accordingly, the expansion determination module 208 uses the statistical model to determine the likelihood value.

At operation 404, the expansion determination module 208 compares the likelihood value to a threshold likelihood value, and at operation 406, the expansion determination module 208 determines whether the likelihood value meets or exceeds the threshold value. If the likelihood value meets or exceeds the threshold likelihood value, the expansion determination module 208 determines that the geographic indicator should be expanded for the second search, and at operation 408, the geographic indicator expansion module 210 generates an expanded geographic indicator. Alternatively, if the likelihood value is less than the threshold likelihood value (i.e., the likelihood value does not meet or exceed the threshold likelihood value), the expansion determination module 208 determines that the search term should be expanded for the second search, and at operation 410, the search term expansion module 212 generates an expanded search term.

At operation 412, the search query module 204 generates expanded search parameters. The search query module 204 uses either the expanded search term or the expanded geographic indicator with the original search parameters to generate the expanded search parameters. For example, the search query module 204 generates the expanded search parameters by combining the expanded geographic indicator with the original search term. Alternatively, the search query module 204 generates the expanded search parameters by combining the expanded search term with the original geographic indicator.

Figure 5:
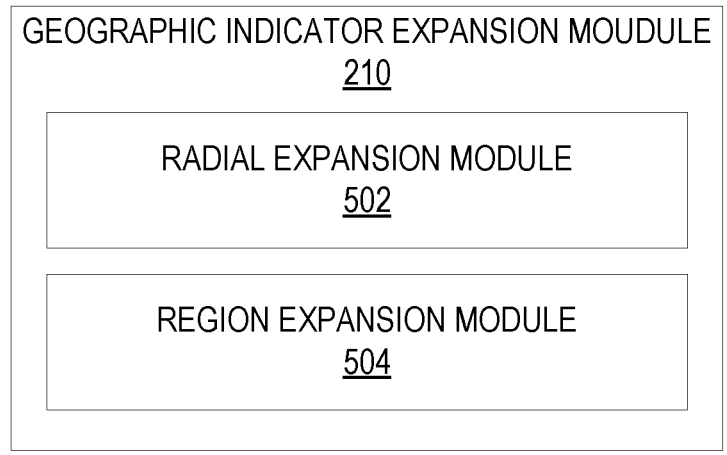
FIG. 5 is a block diagram of the geographic indicator expansion module, according to some example embodiments.

FIG. 5 is a block diagram of the geographic indicator expansion module 210 according to some example embodiments. To avoid obscuring the inventive subject matter with unnecessary detail, various functional components (e.g., modules) that are not germane to conveying an understanding of the inventive subject matter have been omitted from FIG. 5. However, a skilled artisan will readily recognize that various additional functional components may be supported by the geographic indicator module 210 to facilitate additional functionality that is not specifically described herein. Furthermore, the various functional modules depicted in FIG. 5 may reside on a single computing device or may be distributed across several computing devices in various arrangements such as those used in cloud-based architectures.

The geographic indicator expansion module 210 generates an expanded geographic indicator based on a given geographic indicator. For example, the geographic indicator expansion module 210 generates an expanded geographic indicator based on the geographic indicator provided by the user as search parameters. The geographic indicator expansion module 210 may expand a geographic indicator using either radial expansion or regional expansion. Radial expansion includes expanding a geographic indicator by expanding a radius by a predetermined distance. For example, using radial expansion, a given radius of 5 miles may be expanded to 10 miles. In contrast, the region expansion module 504 expands a geographic region by expanding the geographic region. For example, using radial expansion, a given geographic region such as the city of San Francisco may be expanded to the geographic region of the San Francisco bay area, which includes the city of San Francisco as well as the surrounding areas (i.e. Oakland, Palo Alto, San Jose, etc.).

The geographic indicator expansion module 210 can be configured to user either expansion technique (i.e., radial expansion or region expansion), or to select which expansion technique to use based on one or more factors. For example, the geographic indicator expansion module 210 may select which expansion technique to use based on the geographic indicator that is provided. For instance, if the geographic indicator is a radius, the geographic expansion module 210 may select to use radial expansion to generate the expanded geographic indicator. Alternatively, if the geographic indicator is a geographic region, such as a city, state, etc., the geographic expansion module 210 may select to use region expansion to generate the expanded geographic indicator.

As shown, the geographic indicator expansion module 210 includes a radial expansion module 502 and a region expansion module 504. The radial expansion module 502 generates an expanded geographic indicator using the radial expansion technique. For example, given an initial geographic indicator (e.g., within 10 miles), the radial expansion module 502 generates an expanded geographic indicator (e.g., within 20 miles).

In some implementations, the radial expansion module 502 simply expands the geographic indicator by a predetermined distance. For example, the radial expansion module 502 expands the geographic indicator by 10 miles. Thus, given a geographic indicator of a 10 mile radius, the radial expansion module 502 generates an expanded geographic indicator of a 20 mile radius.

In some embodiments, the distance by which the radial expansion module 502 expands a geographic indicator is based on the population density of the geographic location. For example, the radial expansion module 502 expands a geographic indicator by a smaller distance when the geographic location has a higher population density, such as cities. Alternatively, the radial expansion module 502 expands a geographic indicator by a larger distance when the geographic location has a lower population density, such as a rural area. This is because increasing the radius by a small margin in a city will most likely result in more search results being returned than in a rural area. For example, expanding a radius by 1 mile in New York City may result in a high number of new results, whereas in extremely rural areas it may require expanding a radius by 30 miles to achieve the same number of search results. Further, people in rural areas may be more willing to travel to a destination than people in densely populated areas, such as cities.

The region expansion module 504 expands a geographic indicator using a regional expansion technique. This includes expanding a geographic indicator based on a geographic region rather than a set radius. The region expansion module 504 maintains a hierarchal listing of geographic regions that is used to identify an expanded geographic region for a given geographic region. For example, the hierarchal listing includes a listing of cities and towns and indicates a greater geographic region that each city and town falls within. Similarly, each greater geographic region may be listed as being a part of an even larger geographic region. For example, the cities San Francisco, Oakland and San Jose may be listed as being a part of the greater San Francisco Bay Area. The San Francisco Bay Area, along with the Sacramento Area may be listed as being a part of Norther California, and Northern California along with Southern California may be listed as being a part of the greater geographic region of the State of California.

The region expansion module 504 searches the hierarchical listing of geographic regions based on a received geographic indicator, and then identifies its greater geographic region, which is used to generate the expanded geographic indicator. For example, given a geographic indicator of the city of San Francisco, the region expansion module 504 searches the hierarchical listing of geographic regions to identify that greater geographic region to which the city of San Francisco falls within (e.g., San Francisco Bay Area, Northern California, Calif., etc.). The region expansion module 504 then returns an expanded geographic indicator that identifies the greater geographic region (e.g., San Francisco Bay Area, Northern California, Calif., etc.).

Figure 6:
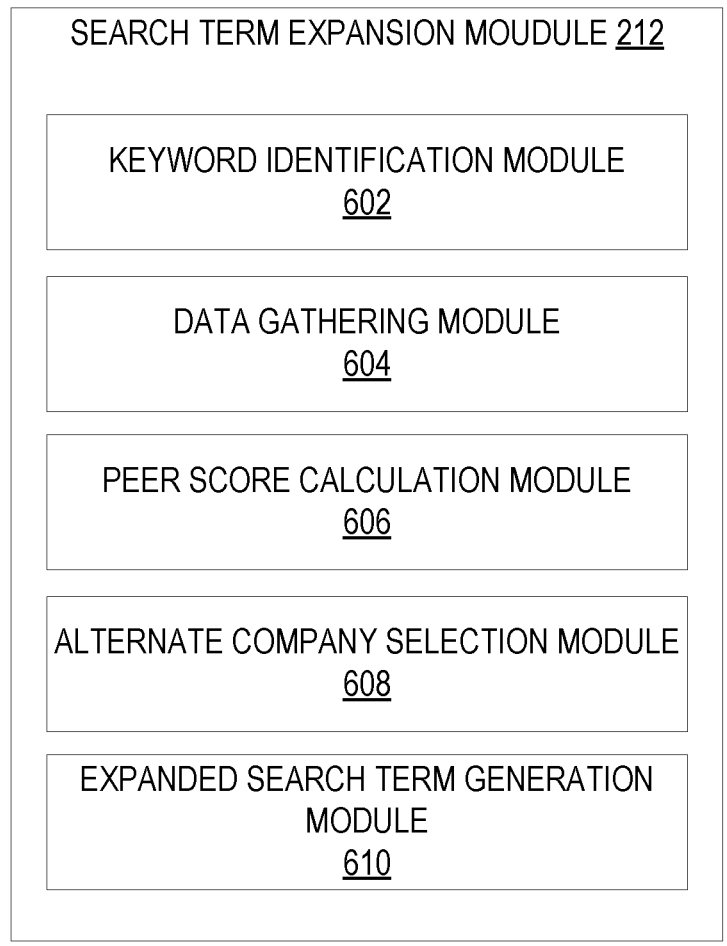
FIG. 6 is a block diagram of the search term expansion module, according to some example embodiments.

FIG. 6 is a block diagram of the search term expansion module 212 according to some example embodiments. To avoid obscuring the inventive subject matter with unnecessary detail, various functional components (e.g., modules) that are not germane to conveying an understanding of the inventive subject matter have been omitted from FIG. 6. However, a skilled artisan will readily recognize that various additional functional components may be supported by the search term expansion module 212 to facilitate additional functionality that is not specifically described herein. Furthermore, the various functional modules depicted in FIG. 6 may reside on a single computing device or may be distributed across several computing devices in various arrangements such as those used in cloud-based architectures The search term expansion module 212 generates an expanded search term based on a given search term. In some implementations, the search term expansion module 212 generates an alternate keyword to supplement or replace an original keyword in the search term. For example, a search term provided by a user to identify a job listing may indicate a desired company (e.g., Apple), as well as a desired position (e.g., software engineer). To generate additional search results for a user, the search term expansion module 212 identifies an alternate company (e.g., Google) to include in the search term, thereby providing a user with additional search results of system engineer positions at both Google and Apple. For example, the alternate company name (e.g., Google) may be used in a second search query in place of the original company name (e.g., Apple). Alternatively, the alternate company name (e.g., Google) may be used in the second search query along with the original company name (e.g., Apple).

The search term expansion module 212 identifies an alternate company based on calculated peer scores that indicate a probability of employees transitioning between companies. For example, a peer score calculated for Apple to Google indicates a probability that employees of Apple would transition to working at Google. Likewise, a peer score calculated for Apple to Facebook indicates a probability that employees of Apple would transition to working at Facebook.

When given a search term that includes a keyword identifying a target company, the search term expansion module 212 identifies alternate companies that have high peer scores with the target company. The search term expansion module 212 then selects an alternate company, which is used to generate the expanded search.

The search term expansion module 212 calculates the peer scores based on historical movement data that indicates employee transitions between companies. The historical movement data is gathered from a professional social networking service, such as LinkedIn, that maintains user work history for multiple user accounts. For example the search term expansion module 212 communicates with the professional social networking service or, alternatively, may be implemented as part of the professional social networking services. The search term expansion module 212 gathers the historical movement data and calculates the peer scores, which are then used to select an alternate company.

As shown, the search term expansion module 212 includes a keyword identification module 602, a data gathering module 604, a peer score calculation module 606, an alternate company selection module 608 and an expanded search term generation module 610. The keyword identification module 602 identifies one or more keywords in a search term that identify a company. To accomplish this the keyword identification module 602 uses a listing of known company names and searches the listing based on the keywords in the search term to identify a match.

The data gathering module 604 gathers historical movement data. Historical movement data is data that indicates employee transitions from company to company. For example, historical movement data includes a user's work history that identifies the companies where the user has worked, including the dates that the user started and ended employment at each company. Historical movement data is available on professional social networking services, such as LinkedIn, where users post this their work history to their user accounts.

In some implementations, the search system 104 is implemented as part of a professional social networking service and thus the data gathering module 604 gathers the historical movement data from local data stores maintained by the professional social networking service. Alternatively, in embodiments in which the search system 104 is separate from the professional social networking service, the data gathering module 604 communicates with computer servers that facilitate the social networking service to gather the historical movement data.

The historical transition data may include pairs of company identifiers to identify employee transitions from one company to another company. For example, a first company identifier in the pair of company identifiers identifies a company that the user previously worked at, and the second company identifier in the pair of company identifiers identifies the company to which the user transitioned.

The peer score calculation module 606 uses the gathered historical movement data to calculate peer scores indicating the probability that employees will transition between companies. For example, to calculate the peer score indicating the probability that employees will transition from a target company to a second company, the peer score calculation module 606 determines, from the gathered historical movement data, the number of employee transitions from the target company to the second company, the number of employee transitions from the target company to any other company, the number of employee transitions from the second company to the target company, the number of employee transitions from the second company to any other company, etc. The peer score calculation module 606 then uses this gathered data to calculate the peer score indicating the probability that employees will transition from the target company to the second company.

The peer score calculation module 606 calculates the peer scores using any of a variety of algorithms or techniques. For example, the peer score calculation module 606 may generate a statistical model based on the historical movement data that outputs peer scores given an input company. The peer score calculation module 606 uses the generated statistical model to determine peer scores for a given company. For example, the peer score calculation module 606 uses a company name identified in a search term as input in the statistical model, resulting in a set of peer scores indicating the probability of employees of the company transitioning to other companies.

As another example, the peer score calculation module 606 calculates the peer scores by generating vectors representing the companies based on the historical movement data. The peer score calculation module 606 then determines the distance between the resulting vectors to determine the peer score between companies. For example, companies with vectors that are closer together are assigned higher peer scores, whereas companies with vectors that are farther apart are assigned lower peer scores.

In some embodiments, the peer score calculation module 606 calculates the peer scores for two companies based on the number of employees that transitioned between the companies and the total number of employees that transitioned from the company to other companies. For example, the peer score calculation module 606 calculates the peer score between company u and company v by determining the number of employees that transitioned from company u to company v, as well as the number of employees that transitioned from company u to all other companies. The peer score calculation module 606 then divides the number of employees that transitioned from company u to company v by the number of employees that transitioned from company u to all other companies, yielding the peer score. The peer score indicates the probability of an employee transitioning from company u to company v.

As another example, the peer score calculation module 604 determines the peer score between company u and company v using the following algorithm:

$$\text{peer\_score}(u, v) = \frac{\mathbb{P}(c_1 = u \mid c_0 = v)}{\max_w \mathbb{P}(c_1 = w \mid c_0 = v)} \cdot \frac{\mathbb{P}(c_1 = v \mid c_0 = u)}{\max_w \mathbb{P}(c_1 = w \mid c_0 = u)}$$

where $P(c_1=v|c_0=u)$ is the probability of transitioning to company v given currently in company u.

These are only a few examples of how the peer score calculation module 606 may calculate a peer score and is not meant to be limiting. The peer score calculation module 606 may use any of a number of techniques and algorithms to calculate a peer score, and this disclosure anticipates all such embodiments.

The alternate company selection module 608 selects an alternate company based on the calculated peer scores. For example, the alternate company selection module 608 selects the alternate company with the highest peer score with the company identified in the search term. Alternatively, the alternate company selection module 608 selects an alternate company that has a peer score that meets or exceeds a threshold peer score. For example, the alternate company selection module 608 identifies all the companies that have a peer score above a threshold peer score and then selects one of the companies as the alternate company. This can be performed using any of a variety of techniques, such as by random, alphabetical, etc.

These are only a couple of examples of how the alternate company selection module 608 selects an alternate company based on the calculated peer scores and is not meant to be limiting. The alternate company selection module 608 may use any of a number of techniques and algorithms to selects an alternate company based on the calculated peer scores, and this disclosure anticipates all such embodiments.

The expanded search term generation module 610 generates an expanded search term based on the alternate company. In some implementations, the expanded search term generation module 610 generates the expanded search term by adding one or more new keywords to the original search term. The added keywords identify the alternate company. For instance, if the original search term was "Software Engineer Apple," the expanded search term generation module 610 may add the alternate company name (e.g. Google) to the search term as a new keyword. As a result, the expanded search term would comprise "Software Engineer Apple Google." A search query based on this expanded search term would return results for software engineer positions at both Apple and Google, thereby providing a user with additional search results.

In other implementations, the expanded search term generation module 610 generates the expanded search term by replacing one or more original keywords with one or more new keywords that identify the alternate company. For example, given the original search term "Software Engineer Apple," the expanded search term generation module 610 replaces the keyword 'Apple' with a keyword identifying the alternate company (e.g., Google). As a result, the expanded search term would comprise "Software Engineer Google." A search query based on this expanded search term would return results for software engineer positions at Google, These search results would then be combined with search results based on the original search term of Software Engineer Apple," thereby providing a user with additional search results for software engineer positions at both Apple and Google.

Figure 7:
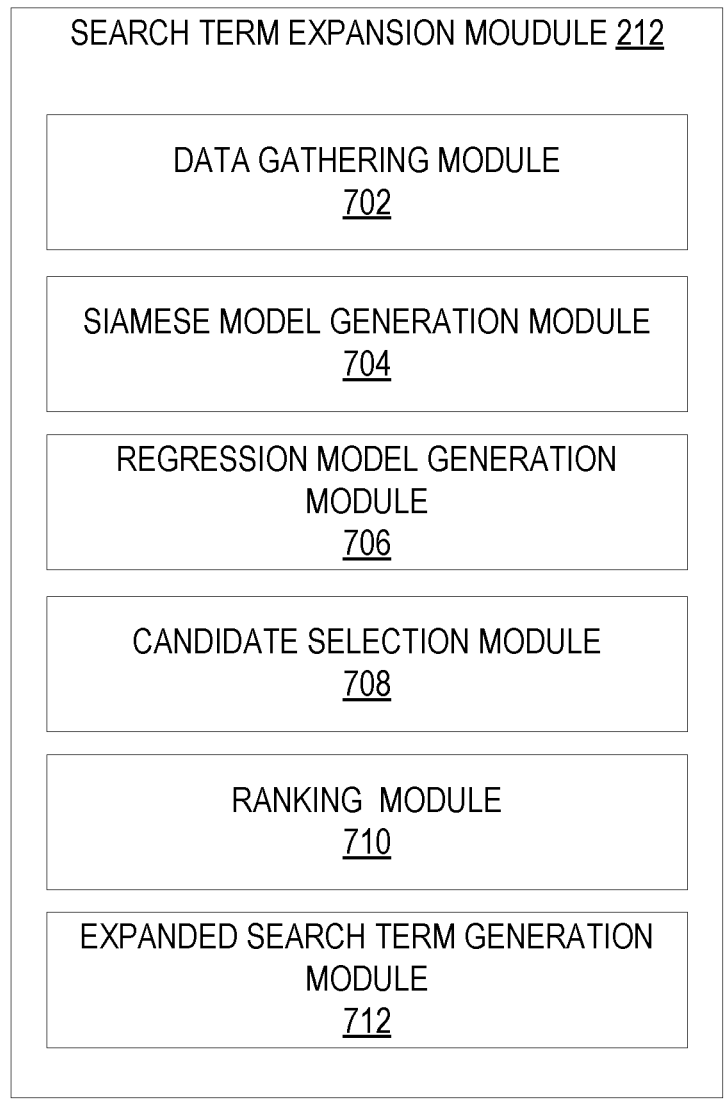
FIG. 7 is a block diagram of the search term expansion module, according to some example embodiments.

FIG. 7 is a block diagram of the search term expansion module 212 according to some example embodiments. To avoid obscuring the inventive subject matter with unnecessary detail, various functional components (e.g., modules) that are not germane to conveying an understanding of the inventive subject matter have been omitted from FIG. 7. However, a skilled artisan will readily recognize that various additional functional components may be supported by the search term expansion module 212 to facilitate additional functionality that is not specifically described herein. Furthermore, the various functional modules depicted in FIG. 7 may reside on a single computing device or may be distributed across several computing devices in various arrangements such as those used in cloud-based architectures The search term expansion module 212 also generates an expanded search term based on previous search result selections by users. The search system 104 maintains historical search logs that identify the search terms used in previous search queries, the search results presented as a result of those previous search queries, as well as data indicating the search results that were selected by the users. The search term expansion module 212 identifies previous search queries that were executed based on one or more of the same keywords that are included in the search term provided by the user. The search term expansion module 212 uses the search results selected by users in response to those previous search queries to identify candidate alternate search terms that may be used to generate an expanded search term. The search term expansion module 212 then ranks the candidate alternate search terms, and selects a candidate alternate search term based on the ranking.

As shown, the search term expansion module 212 includes a data gathering module 702, a Siamese model generation module 704, a regression model generation module 706, a candidate selection module 708, a ranking module 710, and an expanded search term generation module 712.

The data gathering module 702 gathers historical search logs. The historical search logs include records that identify search terms used in previous search queries, the search results presented as a result of those previous search queries, and the search results that were selected by the users. The search results include the titles of the search results that were presented to users. For example, in systems that execute search queries for available jobs, the search results include the titles of jobs identified as a result of the user's provided search parameters. The data gathering module 702 gathers the historical search logs from the data storage 214.

The Siamese model generation module 704 generates a Siamese model that determines a set of candidate alternate search terms based on an input search term. The Siamese model is a Siamese type deep semantic similarity model (DSSM) with different configurations for matching search terms to corresponding keywords in the titles of the search results that were previously presented to users. The Siamese model generation module 704 generates the Siamese model based on the historical search logs gathered by the data gathering module 702. Specifically, the Siamese model generation module 704 trains the Siamese model on search terms and the titles of the corresponding selected search results. The Siamese model generation module 704 trains a pair of same networks with parameter sharing. One of the models is trained for the search terms, and the other model is trained for the titles of the corresponding selected search results.

The Siamese model includes multiple layers. For example, the Siamese model includes an embedding layer, a deep network later, and a similarity layer. Data input into the Siamese model is processed through each layer to provide an output. The Siamese model takes as input both a search term and a title of a clicked search result, and outputs a similarity score indicating a determined similarity between the search term and the title of the clicked search result.

Figure 8:
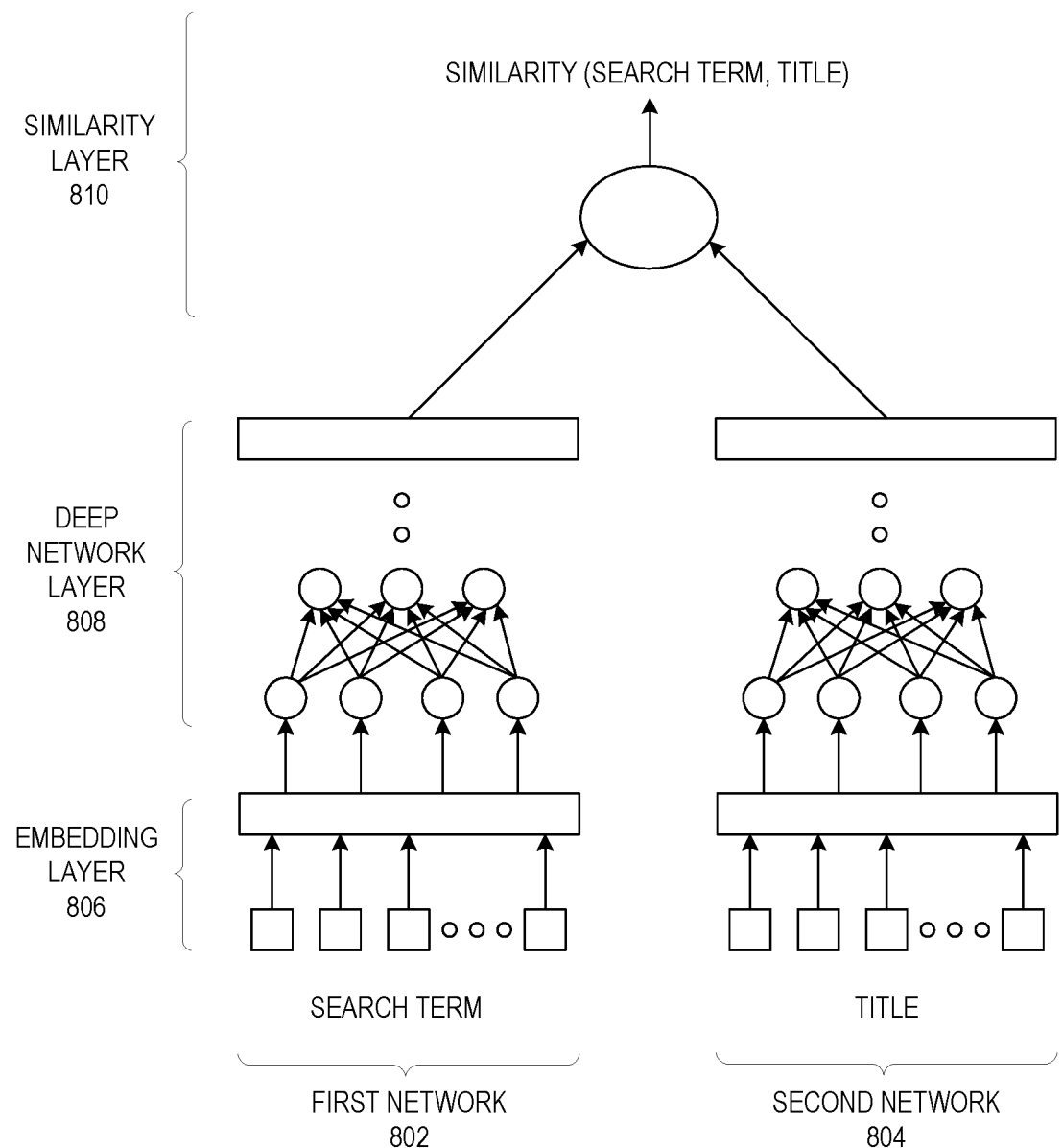
FIG. 8 illustrates a Siamese model, accordingly to some example, embodiments

FIG. 8 illustrates a Siamese model 800, accordingly to some example, embodiments. As shown, the Siamese model 800 includes two similar networks; a first network 802 for search terms, and a second network 804 for the titles of selected search results. The first network 802 takes as input a search term, which includes either a combination of keywords that make up the search term, or a subset of the keywords that make up the search term. The second network 804 takes as input the title of a clicked search result. This includes either a combination of each keyword included the title or a subset of the keywords.

As shown, the Siamese model 800 includes 3 layers; an embedding layer 806, a deep network layer 808, and a similarity layer 810. Data that is input into the first network 802 (i.e., search term) and the second network 804 (i.e., title of a clicked search result) of the Siamese model 800 are processed through each of the three layers 806, 808 and 810, and result in a single output similarity score. The similarity score indicates a similarity between the input search term and the input title of a clicked search result. For example, the data inputs are first processed through the embedding layer 806, followed by the deep network layer 808, and then finally through the similarity layer 810. Although the Siamese model 800 is shown as having three layers 806, 808 and 810, this is only one example and is not meant to be limiting. The Siamese model 800 may have any number of layers, and any of the layers (e.g., the three layers 806, 808 or 810) may have any number of sublayers. This disclosure anticipates all such embodiments. Each of the layers 806, 808 and 810 of the Siamese model 800 are discussed in greater detail below.

The embedding layer 806 learns the semantic representation of a data input. This is accomplished in two steps. In the first step, the incoming text of the input data (i.e., search term and title of search result) is converted into multiple n-letter tokens. For example, for assuming that n=3, the embedding layer 806 converts the input text "abc" into the following 3-letter tokens: #ab, abc, and bc #, where # is the boundary token. Hashing the input text into n-letter tokens provides several advantages, such as dimensionality reduction and Out of Vocabulary (OOV) word representation.

At the second step, the embedding layer 806 converts the previously hashed tokens (i.e., n-letter tokens) into vectors in a multi-dimensional vector space. For example, the embedding layer 806 takes the previously hashed tokens and represents them in a 300-dimensional vector space. Although the two steps of the embedding layer 806 (i.e., hashing the input tokens and converting them into vectors) is described as being a single layer in the Siamese model 800 this is just one way of describing the Siamese model 800, and is not meant to be limiting. The functionality of the embedding layer 806 may also be described as two separate layers. For example, a first layer may include hashing the input tokens into multiple n-letter tokens, and the second layer may include converting the previously hashed tokens (i.e., n-letter tokens) into vectors in a multi-dimensional vector space.

The deep network layer 808 may be comprised of multiple neural network layers. The deep network layer may include fully connected connections among the neural network layers. The deep network layer 808 may use tanh as the activation unit. The deep network layer 808 receives as input the vector representations generated by the embedding layer 806, and provides the output to the similarity later 810.

The similarity layer 810 is a cosine similarity layer. The similarity layer 810 takes the output of the first network 802 and the second network 804, which are vector representations of the inputs of each network 802 and 804, and determines a similarity score indicating a similarity between the two inputs. In other words, the similarity score indicates a similarity between the search term input into the first network 802 and title input into the second network 804. The similarity layer 810 determines the similarity score by determining a cosine similarity between the two vector representations. Cosine similarity is a measure of similarity between two non-zero vectors of an inner product space that measures the cosine of the angle between them.

Ultimately, the Siamese network 800 provides a set of candidate alternate search terms for a given search term, as well as similarity scores for each of the search terms. The similarity score for each candidate alternate search term indicates a similarity between the search term and the respective candidate alternate search term.

Returning to the discussion of FIG. 7, the regression model generation module 706 generates a regression model that ranks the set of candidate alternate search terms. The regression model generation module 706 trains the regression model based on historical search logs gathered by the data gathering module 702. Specifically, the regression model is trained on previous search query reformulations identified in the historical search logs. A search query reformulation is a revised search query generated by a user during a single session. A session is a period of time in which a user is performing searches. The regression model generation module 706 analyzes the historical search logs to identify search sessions that include two or more consecutive search queries that are each within a threshold time period of their preceding and following search queries. For example, the regression model generation module 706 determines that two consecutive search queries are part of the same search session if they occurred within a threshold period of time of each other. Alternatively, the regression model generation module 706 determines that two consecutive search queries are part of different search session if they occurred outside of a threshold period of time of each other. A search session may include any number of search queries, as long as each search query is within the threshold period of time of the previous search query in the search session.

The regression model generation module 706 may use other rules in determining search sessions. For example, the regression model generation module 706 discard a search query if it is an advanced or facet search query. As another example, the regression model generation module 706 may merge two search queries if they are equal (e.g., include the same search term and geographic indicator), or are determined to be essentially equal. For example, a second search query may include a search term that is a corrected spelling of a search term included in the first search query. The regression model generation module 706 may discard an identified search session if there are less than 2 search queries in the search session, any search query in the search session is a phrase query or a Boolean query, any search query in the search session includes an inappropriate term, or any search query in the search session includes emails or other personal information.

After identifying the search session, the regression model generation module 706 identifies query reformulation pairs in each search session and calculates features for each identified query reformulation pair. A query reformulation pair is a pair of two search queries in a search session. For example, given a search session that includes a set of search queries $q_1, q_2, \ldots q_n$, each pair $(q_i, q_j)$ is identified as a query reformulation pair where $i<j$ (i.e., $q_i$ occurred chronologically before $q_j$).

For each identified query reformulation pair $(q_i, q_j)$, the regression model generation module 706 computes a set of features. The features may include the searchers identifier, whether $q_i$ was clicked, whether $q_j$ was clicked, whether $q_i$ was spelled correctly, whether $q_j$ was spelled correctly, spell correction of $q_i$, spell correction of $q_j$, whether $q_i$ was followed by a facet view, whether $q_j$ was followed by a facet view, an index of $q_i$ in the search session, whether $q_j$ is the last search query in the search session, the number of search queries that occurred between $q_1$ and $q_j$, an elapsed time between $q_i$ and $q_j$, a number of search results from $q_i$, a number of search results from $q_j$, etc.

For each identified query reformulation pair $(q_i, q_j)$, the regression model generation module 706 may also compute aggregated features determined from multiple search sessions. Examples of aggregates features include a number of occurrences of the query reformulation pair, number of distinct searchers, a chi-square test score, number of occurrences in which $q_i$ was clicked, number of occurrences in which $q_j$ was clicked, number of occurrences in which both $q_i$ and $q_j$ were clicked, number of occurrences where $q_j$ is abandoned (i.e., $q_j$ is the last search query in the search session and $q_j$ wasn't clicked), the mean/variance of number of search queries that occurred between $q_i$ and $q_j$, the mean/variance of the elapses time between $q_i$ and $q_j$, etc.

For each identified query reformulation pair $(q_i, q_j)$, the regression model generation module 706 may also compute query level features. Examples of query level features include whether a number of search results from $q_i$ is less than a threshold number, a relation of the number of search results from $q_i$ versus a number of search results from $q_j$, whether $q_j$ is a relaxation of $q_i$ (broadening scope of $q_i$), whether $q_j$ is a restriction of $q_i$ (narrowing of $q_i$), etc.

The regression model generation module 706 trains the regression model based on the identified query reformulation pairs and their corresponding features. The resulting regression model is used to rank the set of candidate alternate search terms.

The candidate selection module 708 determines a set of candidate alternate search terms based on a given search term. For example, the candidate selection module 708 uses the Siamese model generated by the Siamese model generation module 704 to generate the set of candidate alternate search terms. That is, the candidate selection module 708 uses a search term provided by a user as input in the Siamese model to produce the set of candidate alternate search terms.

The ranking module 710 ranks the set of candidate alternate search terns using the regression model generated by the regression model generation module 706. For example the ranking module 710 uses the set of candidate alternate search terms as input in the regression module to result in a ranking of the set of candidate alternate search terms.

The expanded search term generation module 712 generates an expanded search term based on the ranked set of candidate alternate search terms. In some implementations, the expanded search term generation module 712 generates the expanded search term by adding one or more new keywords to the original search term. The added keywords are selected from the ranked set of candidate alternate search terms. For example, the expanded search term generation module 712 selects one or more of the candidate alternate search terms that are ranked the highest.

In other implementations, the expanded search term generation module 712 generates the expanded search term by replacing one or more original keywords with one or more of the candidate alternate search terms. The candidate alternate search terms are selected from the ranked set of candidate alternate search terms. For example, the expanded search term generation module 712 selects one or more of the candidate alternate search terms that are ranked the highest.

Figure 9:
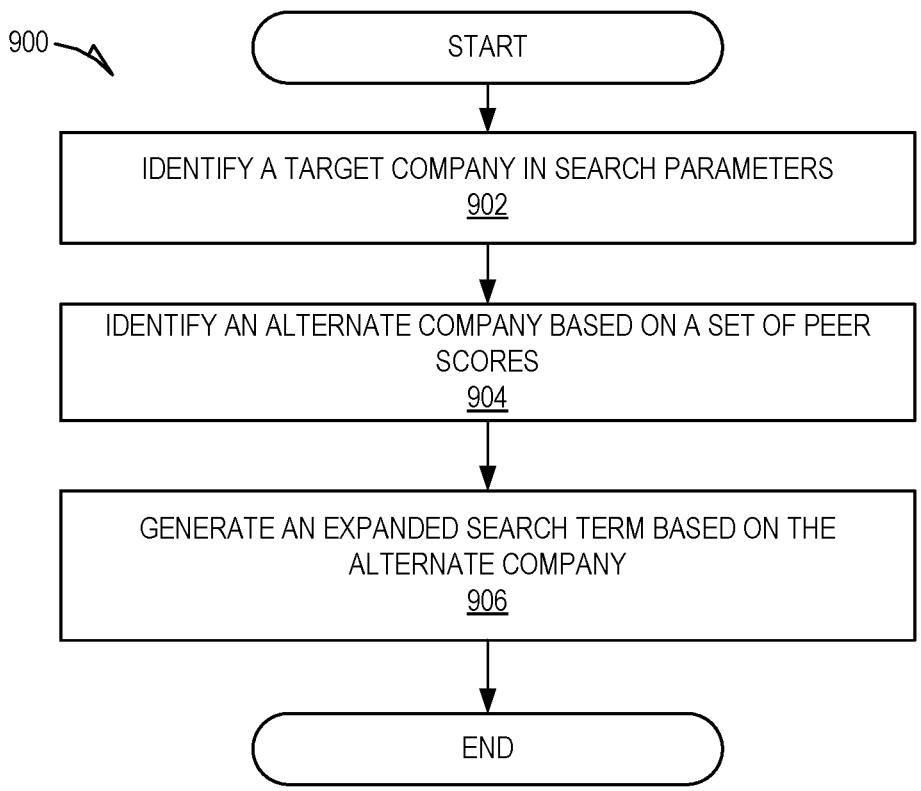
FIG. 9 is a flowchart showing an example method of determining an expanded search term, according to certain example embodiments.

FIG. 9 is a flowchart showing an example method of determining an expanded search term, according to certain example embodiments. The method 900 may be embodied in computer readable instructions for execution by one or more processors such that the operations of the method 900 may be performed in part or in whole by the search term expansion module 212; accordingly, the method 900 is described below by way of example with reference thereto. However, it shall be appreciated that at least some of the operations of the method 900 may be deployed on various other hardware configurations and the method 900 is not intended to be limited to the search term expansion module 212.

At operation 902, the keyword identification module 602 identifies a target company in search parameters. The search parameters are provided by a user to perform a search query. The keyword identification module 602 uses a listing of known company names and searches the listing based on the keywords in the search term to identify a match.

At operation 904, the alternate company selection module 608 identifies an alternate company based on a set of peer scores. The peer scores indicate the probability that employees will transition between companies. The alternate company selection module 608 selects an alternate company based on the calculated peer scores. For example, the alternate company selection module 608 selects the alternate company with the highest peer score with the company identified in the search term. Alternatively, the alternate company selection module 608 selects an alternate company that has a peer score that meets or exceeds a threshold peer score. For example, the alternate company selection module 608 identifies all the companies that have a peer score above a threshold peer score and then selects one of the companies as the alternate company. This can be performed using any of a variety of techniques, such as by random, alphabetical, etc.

At operation 906, the expanded search term generation module 610 generates an expanded search term based on the alternate company. In some implementations, the expanded search term generation module 610 generates the expanded search term by adding one or more new keywords to the original search term. The added keywords identify the alternate company. For instance, if the original search term was "Software Engineer Apple," the expanded search term generation module 610 may add the alternate company name (e.g. Google) to the search term as a new keyword. As a result, the expanded search term would comprise "Software Engineer Apple Google." A search query based on this expanded search term would return results for software engineer positions at both Apple and Google, thereby providing a user with additional search results.

In other implementations, the expanded search term generation module 610 generates the expanded search term by replacing one or more original keywords with one or more new keywords that identify the alternate company. For example, given the original search term "Software Engineer Apple," the expanded search term generation module 610 replaces the keyword 'Apple' with a keyword identifying the alternate company (e.g., Google). As a result, the expanded search term would comprise "Software Engineer Google." A search query based on this expanded search term would return results for software engineer positions at Google, These search results would then be combined with search results based on the original search term of Software Engineer Apple," thereby providing a user with additional search results for software engineer positions at both Apple and Google.

Figure 10:
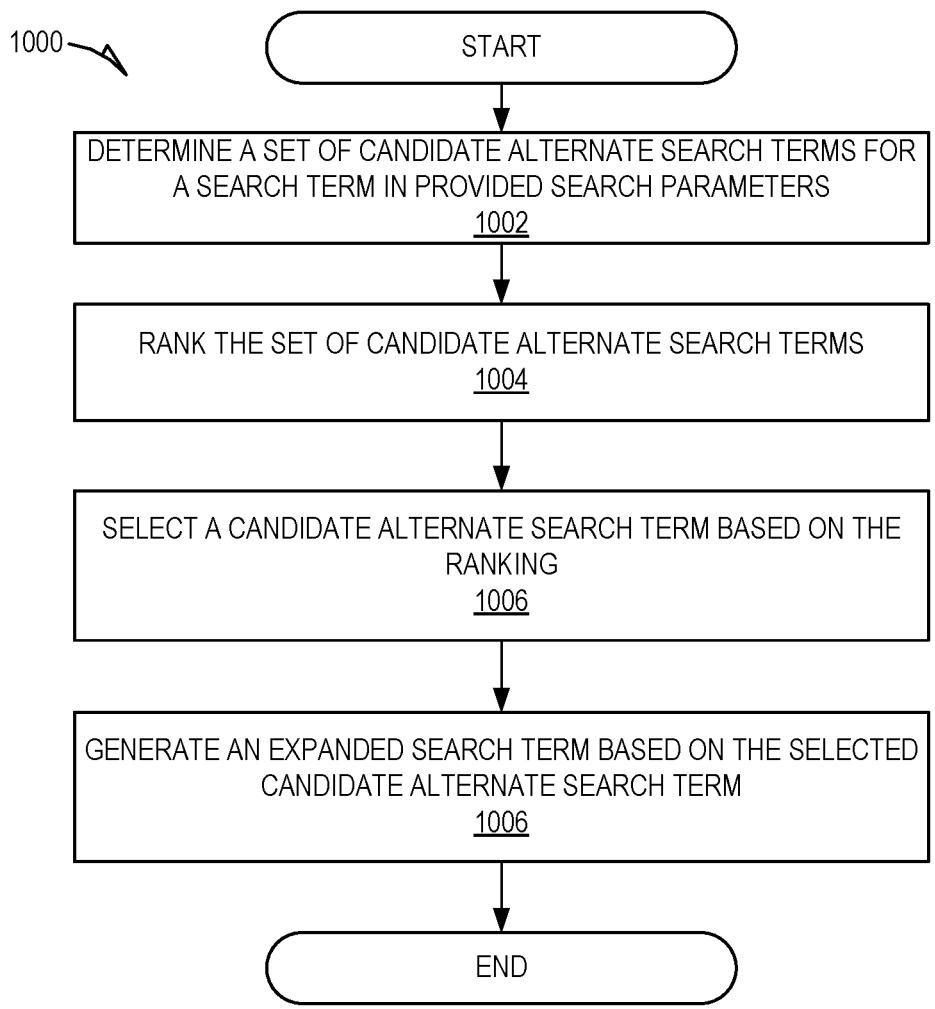
FIG. 10 is a flowchart showing an example method of determining an expanded search term, according to certain example embodiments.

FIG. 10 is a flowchart showing an example method of determining an expanded search term, according to certain example embodiments. The method 1000 may be embodied in computer readable instructions for execution by one or more processors such that the operations of the method 1000 may be performed in part or in whole by the search term expansion module 212; accordingly, the method 1000 is described below by way of example with reference thereto. However, it shall be appreciated that at least some of the operations of the method 1000 may be deployed on various other hardware configurations and the method 1000 is not intended to be limited to the search term expansion module 212.

At operation 1002, the candidate selection module 708 determines a set of candidate alternate search terms for a search term included in search parameters. For example, the candidate selection module 708 uses the Siamese model generated by the Siamese model generation module 704 to generate the set of candidate alternate search terms. That is, the candidate selection module 708 uses the search term included in the search parameters as input in the Siamese model to produce the set of candidate alternate search terms.

At operation 1004, the ranking module 710 ranks the set of candidate alternate search terms. The ranking module 710 ranks the set of candidate alternate search terns using the regression model generated by the regression model generation module 706. For example the ranking module 710 uses the set of candidate alternate search terms as input in the regression module to result in a ranking of the set of candidate alternate search terms.

At operation 1006, the expanded search term generation module 712 selects a candidate alternate search term based on the ranking. For example, the expanded search term generation module 712 selects one or more candidate alternate search terms with the highest ranking.

At operation, 1008, the expanded search term generation module 712 generates an expanded search term based on the selected candidate alternate search term. In some implementations, the expanded search term generation module 712 generates the expanded search term by adding the selected candidate alternate search term to the original search term. In other implementations, the expanded search term generation module 712 generates the expanded search term by replacing one or more keywords in the original search term with one or more of the candidate alternate search terms.

Figure 11A:
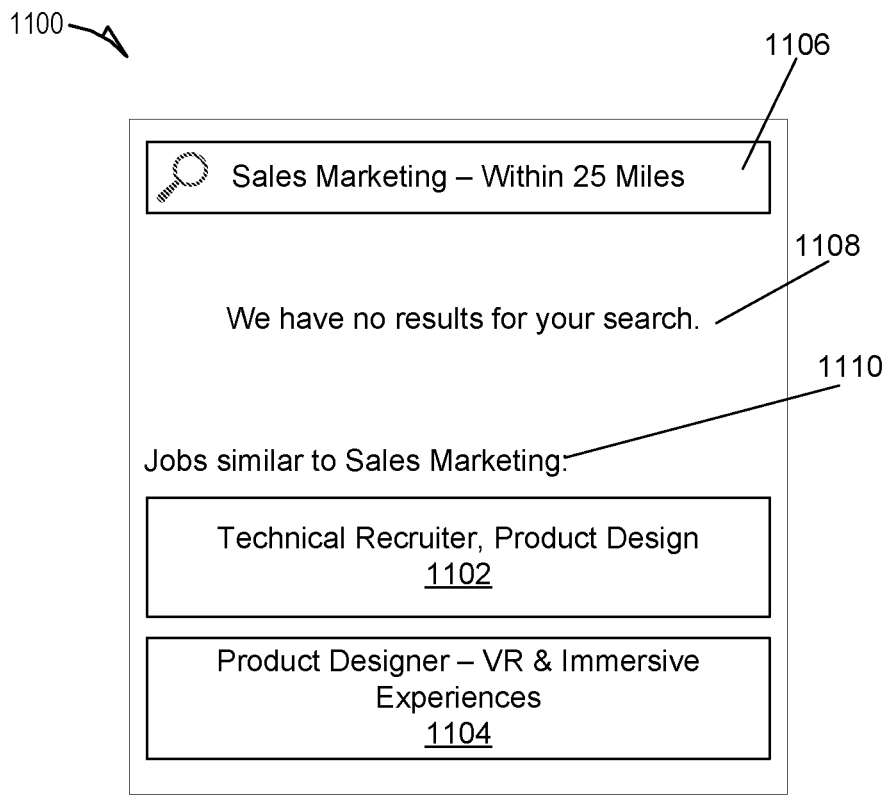
FIGS. 11A and 11B are examples of screenshots of search results generated from an expanded search query, according to some embodiments.
Figure 11B:
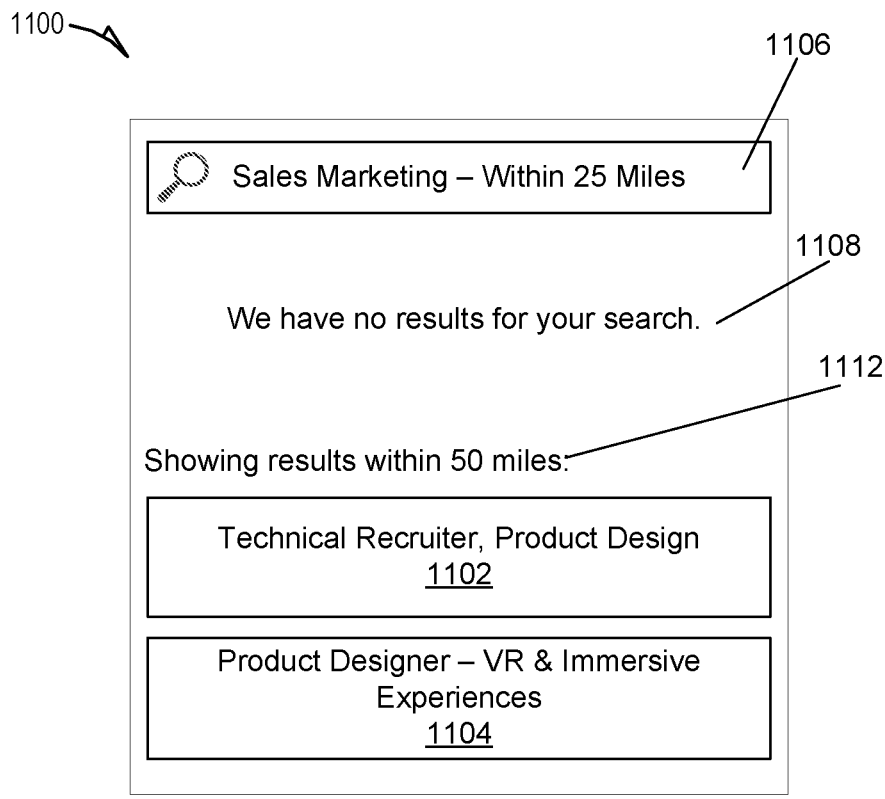

FIGS. 11A and 11B are screenshots of search results generated from an expanded search query, according to some example embodiments. FIG. 11A shows a search interface 1100 presenting a user with search results 1102 and 1104 from an expanded search query. The search interface 1100 includes a search input box 1106, which a user has used to enter search parameters including a search term (i.e., Sales Marketing), and a geographic indictor (i.e., within 25 miles). A search query based on the user provided search parameters has resulted in no results, as indicated by a message 1108 presented to the user on the search interface 1100. The search results 1102 and 1104 presented in the search interface 1100 are the result of an expanded search query that was executed using an expanded search term. This is indicated by a second message 1110 presented to the user that indicates that the search results are for jobs similar to sales marketing, which was the user's provided search term.

FIG. 11B shows the search interface as in FIG. 11A, however in this case the search results 1102 and 1104 are based on an expanded geographic indicator, rather than an expanded search term. This is indicated by the message 1112 indicating that the search results 1102 and 1104 are based on a geographic indicator of within 50 miles, rather than within just 25 miles as provided by the user's search parameters.

Software Architecture

Figure 12:
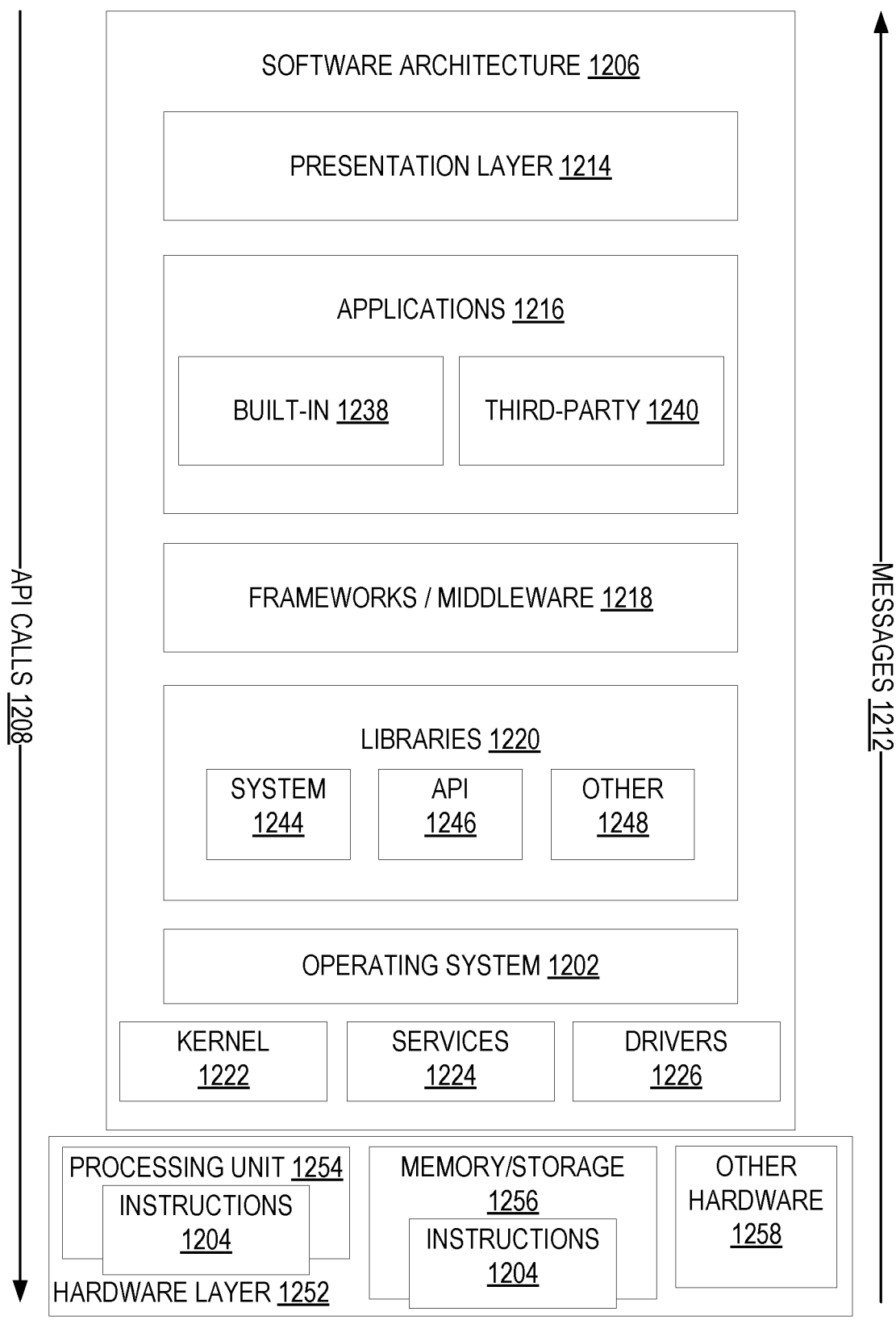
FIG. 12 is a block diagram illustrating a representative software architecture, which may be used in conjunction with various hardware architectures herein described.

FIG. 12 is a block diagram illustrating an example software architecture 1206, which may be used in conjunction with various hardware architectures herein described. FIG. 12 is a non-limiting example of a software architecture 1206 and it will be appreciated that many other architectures may be implemented to facilitate the functionality described herein. The software architecture 1206 may execute on hardware such as machine 1300 of FIG. 13 that includes, among other things, processors 1304, memory 1314, and (input/output) I/O components 1318. A representative hardware layer 1252 is illustrated and can represent, for example, the machine 1300 of FIG. 13. The representative hardware layer 1252 includes a processing unit 1254 having associated executable instructions 1204. Executable instructions 1204 represent the executable instructions of the software architecture 1206, including implementation of the methods, components, and so forth described herein. The hardware layer 1252 also includes memory and/or storage modules memory/storage 1256, which also have executable instructions 1204. The hardware layer 1252 may also comprise other hardware 1258.

In the example architecture of FIG. 12, the software architecture 1206 may be conceptualized as a stack of layers where each layer provides particular functionality. For example, the software architecture 1206 may include layers such as an operating system 1202, libraries 1220, frameworks/middleware 1218, applications 1216, and a presentation layer 1214. Operationally, the applications 1216 and/or other components within the layers may invoke API calls 1208 through the software stack and receive a response such as messages 1212 in response to the API calls 1208. The layers illustrated are representative in nature and not all software architectures have all layers. For example, some mobile or special purpose operating systems may not provide a frameworks/middleware 1218, while others may provide such a layer. Other software architectures may include additional or different layers.

The operating system 1202 may manage hardware resources and provide common services. The operating system 1202 may include, for example, a kernel 1222, services 1224, and drivers 1226. The kernel 1222 may act as an abstraction layer between the hardware and the other software layers. For example, the kernel 1222 may be responsible for memory management, processor management (e.g., scheduling), component management, networking, security settings, and so on. The services 1224 may provide other common services for the other software layers. The drivers 1226 are responsible for controlling or interfacing with the underlying hardware. For instance, the drivers 1226 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 1220 provide a common infrastructure that is used by the applications 1216 and/or other components and/or layers. The libraries 1220 provide functionality that allows other software components to perform tasks in an easier fashion than to interface directly with the underlying operating system 1202 functionality (e.g., kernel 1222, services 1224 and/or drivers 1226). The libraries 1220 may include system libraries 1244 (e.g., C standard library) that may provide functions such as memory allocation functions, string manipulation functions, mathematical functions, and the like. In addition, the libraries 1220 may include API libraries 1246 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1220 may also include a wide variety of other libraries 1248 to provide many other APIs to the applications 1216 and other software components/modules.

The frameworks/middleware 1218 (also sometimes referred to as middleware) provide a higher-level common infrastructure that may be used by the applications 1216 and/or other software components/modules. For example, the frameworks/middleware 1218 may provide various graphic user interface (GUI) functions, high-level resource management, high-level location services, and so forth. The frameworks/middleware 1218 may provide a broad spectrum of other APIs that may be used by the applications 1216 and/or other software components/modules, some of which may be specific to a particular operating system 1202 or platform.

The applications 1216 include built-in applications 1238 and/or third-party applications 1240. Examples of representative built-in applications 1238 may include, but are not limited to, a contacts application, a browser application, a book reader application, a location application, a media application, a messaging application, and/or a game application. Third-party applications 1240 may include an application developed using the ANDROID™ or IOS™ software development kit (SDK) by an entity other than the vendor of the particular platform, and may be mobile software running on a mobile operating system such as IOS™ ANDROID™, WINDOWS® Phone, or other mobile operating systems. The third-party applications 1240 may invoke the API calls 1208 provided by the mobile operating system (such as operating system 1202) to facilitate functionality described herein.

The applications 1216 may use built in operating system functions (e.g., kernel 1222, services 1224 and/or drivers 1226), libraries 1220, and frameworks/middleware 1218 to create user interfaces to interact with users of the system. Alternatively, or additionally, in some systems, interactions with a user may occur through a presentation layer, such as presentation layer 1214. In these systems, the application/ component "logic" can be separated from the aspects of the application/component that interact with a user.

Figure 13:
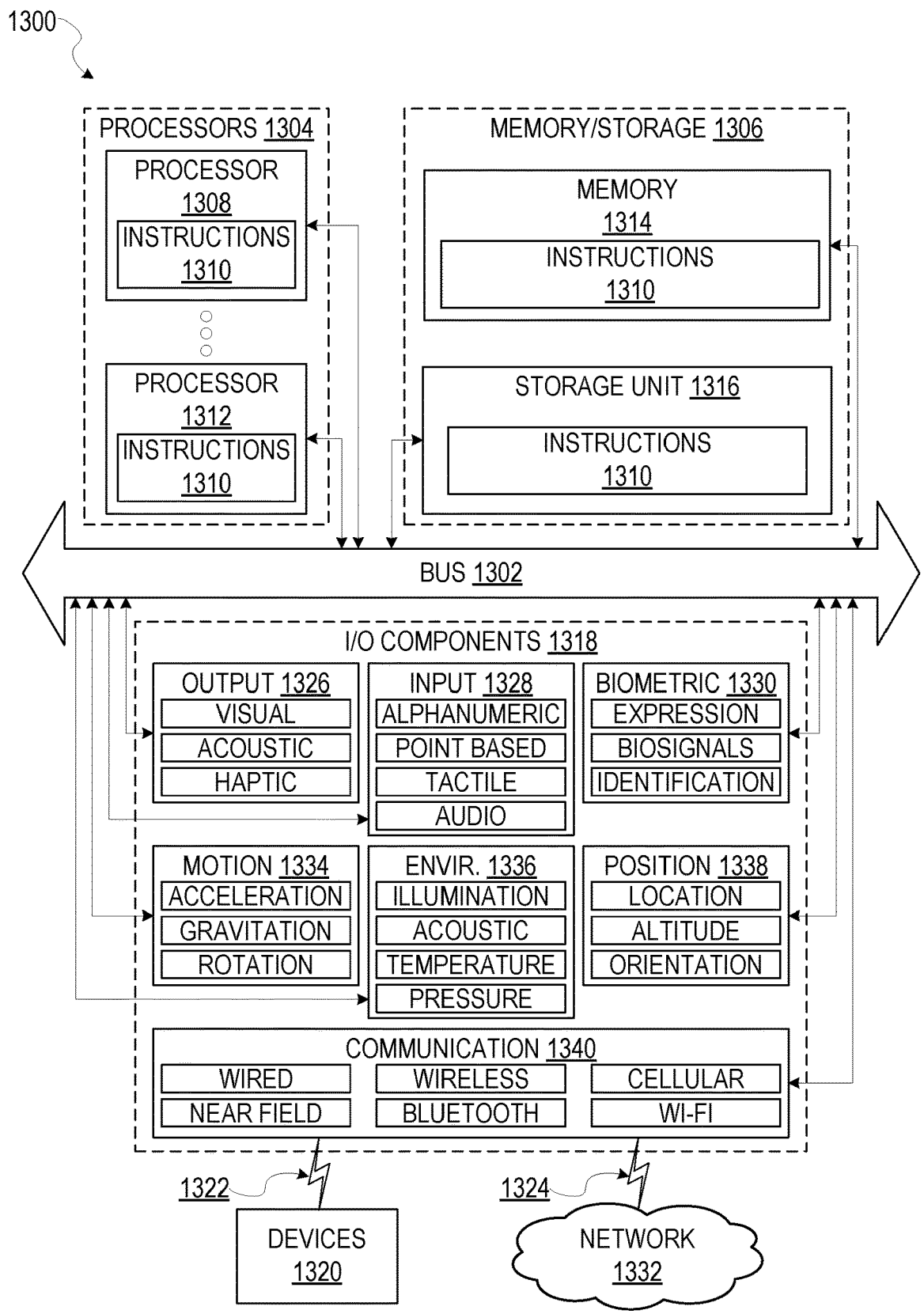
FIG. 13 is a block diagram illustrating components of a machine, according to some example embodiments, able to read instructions from a machine-readable medium (e.g., a machine-readable storage medium) and perform any one or more of the methodologies discussed herein.

FIG. 13 is a block diagram illustrating components of a machine 1300, according to some example embodiments, able to read instructions 1204 from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1310 (e.g., software, a program, an application, an applet, an app, or other executable code) for causing the machine 1300 to perform any one or more of the methodologies discussed herein may be executed. As such, the instructions 1310 may be used to implement modules or components described herein. The instructions 1310 transform the general, non-programmed machine 1300 into a particular machine 1300 programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 1300 capable of executing the instructions 1310, sequentially or otherwise, that specify actions to be taken by machine 1300. Further, while only a single machine 1300 is illustrated, the term "machine" shall also be taken to include a collection of machines that individually or jointly execute the instructions 1310 to perform any one or more of the methodologies discussed herein.

The machine 1300 may include processors 1304, memory/storage 1306, and I/O components 1318, which may be configured to communicate with each other such as via a bus 1302. The memory/storage 1306 may include a memory 1314, such as a main memory, or other memory storage, and a storage unit 1316, both accessible to the processors 1304 such as via the bus 1302. The storage unit 1316 and memory 1314 store the instructions 1310 embodying any one or more of the methodologies or functions described herein. The instructions 1310 may also reside, completely or partially, within the memory 1314, within the storage unit 1316, within at least one of the processors 1304 (e.g., within the processor's cache memory), or any suitable combination thereof, during execution thereof by the machine 1300. Accordingly, the memory 1314, the storage unit 1316, and the memory of processors 1304 are examples of machine-readable media.

The I/O components 1318 may include a wide variety of components to receive input, provide output, produce output, transmit information, exchange information, capture measurements, and so on. The specific I/O components 1318 that are included in a particular machine 1300 will depend on the type of machine. For example, portable machines such as mobile phones will likely include a touch input device or other such input mechanisms, while a headless server machine will likely not include such a touch input device. It will be appreciated that the I/O components 1318 may include many other components that are not shown in FIG. 13. The I/O components 1318 are grouped according to functionality merely for simplifying the following discussion and the grouping is in no way limiting. In various example embodiments, the I/O components 1318 may include output components 1326 and input components 1328. The output components 1326 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1328 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1318 may include biometric components 1330, motion components 1334, environmental components 1336, or position components 1338 among a wide array of other components. For example, the biometric components 1330 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1334 may include acceleration sensor components (e.g., accelerometer), gravitation sensor components, rotation sensor components (e.g., gyroscope), and so forth. The environmental components 1336 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1338 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1318 may include communication components 1340 operable to couple the machine 1300 to a network 1332 or devices 1320 via coupling 1324 and coupling 1322, respectively. For example, the communication components 1340 may include a network interface component or other suitable device to interface with the network 1332. In further examples, communication components 1340 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1320 may be another machine or any of a wide variety of peripheral devices (e.g., a peripheral device coupled via a USB).

Moreover, the communication components 1340 may detect identifiers or include components operable to detect identifiers. For example, the communication components 1340 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1340, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 1310 for execution by the machine 1300, and includes digital or analog communications signals or other intangible medium to facilitate communication of such instructions 1310. Instructions 1310 may be transmitted or received over the network 1332 using a transmission medium via a network interface device and using any one of a number of well-known transfer protocols.

"CLIENT DEVICE" in this context refers to any machine 1300 that interfaces to a communications network 1332 to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, STBs, or any other communication device that a user may use to access a network 1332.

"COMMUNICATIONS NETWORK" in this context refers to one or more portions of a network 1332 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 1332 or a portion of a network 1332 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 1310 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 1310. The term "machine-readable medium" shall also be taken to include any medium, or combination of multiple media, that is capable of storing instructions 1310 (e.g., code) for execution by a machine 1300, such that the instructions 1310, when executed by one or more processors 1304 of the machine 1300, cause the machine 1300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a stand-alone computer system, a client computer system, or a server computer system) or one or more hardware components of a computer system (e.g., a processor or a group of processors 1304) may be configured by software (e.g., an application 1216 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 1304 or other programmable processor 1304. Once configured by such software, hardware components become specific machines 1300 (or specific components of a machine 1300) uniquely tailored to perform the configured functions and are no longer general-purpose processors 1304. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 1304 configured by software to become a special-purpose processor, the general-purpose processor 1304 may be configured as respectively different special-purpose processors (e.g., comprising different hardware components) at different times. Software accordingly configures a particular processor or processors 1304, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 1302) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 1304 that are temporarily configured (e.g., by software) or permanently configured to perform the relevant operations. Whether temporarily or permanently configured, such processors 1304 may constitute processor-implemented components that operate to perform one or more operations or functions described herein. As used herein, "processor-implemented component" refers to a hardware component implemented using one or more processors 1304. Similarly, the methods described herein may be at least partially processor-implemented, with a particular processor or processors 1304 being an example of hardware. For example, at least some of the operations of a method may be performed by one or more processors 1304 or processor-implemented components. Moreover, the one or more processors 1304 may also operate to support performance of the relevant operations in a "cloud computing" environment or as a "software as a service" (SaaS). For example, at least some of the operations may be performed by a group of computers (as examples of machines 1300 including processors 1304), with these operations being accessible via a network 1332 (e.g., the Internet) and via one or more appropriate interfaces (e.g., an API). The performance of certain of the operations may be distributed among the processors 1304, not only residing within a single machine 1300, but deployed across a number of machines 1300. In some example embodiments, the processors 1304 or processor-implemented components may be located in a single geographic location (e.g., within a home environment, an office environment, or a server farm). In other example embodiments, the processors 1304 or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine 1300. A processor 1304 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor may further be a multi-core processor having two or more independent processors 1304 (sometimes referred to as "cores") that may execute instructions 1310 contemporaneously.

What is claimed is:

1. A method comprising:
executing a search query based on a search term and a geographic indicator, yielding search results, the geographic indicator describing a first geographic region;
in response to determining that a number of the search results is less than a threshold number, determining, based on historical search logs including records of previously submitted search queries by users in the first geographic region, a likelihood value indicating a likelihood that users in the first geographic region would expand the geographic indicator in an expanded search of the search query, wherein determining the likelihood value comprises:
using the first geographic region as input into a statistical model generated from the historical search logs, the statistical model outputting the likelihood value based on receiving the first geographic region as input;
in response to determining that the likelihood value is less than a threshold likelihood value, determining to expand the search term for the expanded search of the search query; and
executing the expanded search of the search query based on an expanded search term and the geographic indicator, yielding expanded search results.

2. The method of claim 1, wherein the expanded search term includes a subset of keywords that were included in the search term.

3. The method of claim 1, further comprising:
receiving, from a client device, search parameters entered by a user of the client device, the search parameters including the search term and the geographic indicator describing the first geographic region.

4. The method of claim 3, further comprising:
causing presentation of the expanded search results by the client device.

5. The method of claim 1, further comprising:
executing a second search query based on a second search term and a second geographic indicator, yielding second search results, the second geographic indicator describing a second geographic region;
in response to determining that a number of the second search results is less than the threshold number, determining a second likelihood value indicating a likelihood that users in the second geographic region would expand the second geographic indicator in an expanded search of the second search query;
in response to determining that the likelihood value exceeds the threshold likelihood value, determining to expand the second geographic indicator for the expanded search of the second search query; and
executing the expanded search of the second search query based on the second search term and an expanded geographic indicator, yielding second expanded search results.

6. The method of claim 5, wherein the expanded geographic indicator describes a third geographic region that encompasses the second geographic region.

7. The method of claim 5, wherein determining the second likelihood value comprises:
using the second geographic region as input into the statistical model generated from the historical search logs, the statistical model outputting the second likelihood value based on receiving the second geographic region as input.

8. A system comprising:
one or more computer processors; and
one or more computer-readable mediums storing instructions that, when executed by the one or more computer processors, cause the system to perform operations comprising:
executing a search query based on a search term and a geographic indicator, yielding search results, the geographic indicator describing a first geographic region;
in response to determining that a number of the search results is less than a threshold number, determining, based on historical search logs including records of previously submitted search queries by users in the first geographic region, a likelihood value indicating a likelihood that users in the first geographic region would expand the geographic indicator in an expanded search of the search query, wherein determining the likelihood value comprises:
using the first geographic region as input into a statistical model generated from the historical search logs, the statistical model outputting the likelihood value based on receiving the first geographic region as input;
in response to determining that the likelihood value is less than a threshold likelihood value, determining to expand the search term for the expanded search of the search query; and
executing the expanded search of the search query based on an expanded search term and the geographic indicator, yielding expanded search results.

9. The system of claim 8, wherein the expanded search term includes a subset of keywords that were included in the search term.

10. The system of claim 8, the operations further comprising:
receiving, from a client device, search parameters entered by a user of the client device, the search parameters including the search term and the geographic indicator describing the first geographic region.

11. The system of claim 10, the operations further comprising:
causing presentation of the expanded search results by the client device.

12. The system of claim 8, the operations further comprising:
executing a second search query based on a second search term and a second geographic indicator, yielding second search results, the second geographic indicator describing a second geographic region;
in response to determining that a number of the second search results is less than the threshold number, determining a second likelihood value indicating a likelihood that users in the second geographic region would expand the second geographic indicator in an expanded search of the second search query;
in response to determining that the likelihood value exceeds the threshold likelihood value, determining to expand the second geographic indicator for the expanded search of the second search query; and
executing the expanded search of the second search query based on the second search term and an expanded geographic indicator, yielding second expanded search results.

13. The system of claim 12, wherein the expanded geographic indicator describes a third geographic region that encompasses the second geographic region.

14. The system of claim 12, wherein determining the second likelihood value comprises:
using the second geographic region as input into the statistical model generated from the historical search logs, the statistical model outputting the second likelihood value based on receiving the second geographic region as input.

15. A non-transitory computer-readable medium storing instructions that, when executed by one or more computer processors of one or more computing devices, cause the one or more computing devices to perform operations comprising:
executing a search query based on a search term and a geographic indicator, yielding search results, the geographic indicator describing a first geographic region;
in response to determining that a number of the search results is less than a threshold number, determining, based on historical search logs including records of previously submitted search queries by users in the first geographic region, a likelihood value indicating a likelihood that users in the first geographic region would expand the geographic indicator in an expanded search of the search query, wherein determining the likelihood value comprises:
using the first geographic region as input into a statistical model generated from the historical search logs, the statistical model outputting the likelihood value based on receiving the first geographic region as input;
in response to determining that the likelihood value is less than a threshold likelihood value, determining to expand the search term for the expanded search of the search query; and
executing the expanded search of the search query based on an expanded search term and the geographic indicator, yielding expanded search results.

16. The non-transitory computer-readable medium of claim 15, wherein the expanded search term includes a subset of keywords that were included in the search term.

17. The non-transitory computer-readable medium of claim 15, the operations further comprising:
  receiving, from a client device, search parameters entered by a user of the client device, the search parameters including the search term and the geographic indicator describing the first geographic region.

18. The non-transitory computer-readable medium of claim 17, the operations further comprising:
  causing presentation of the expanded search results by the client device.

19. The non-transitory computer-readable medium of claim 15, the operations further comprising:
  executing a second search query based on a second search term and a second geographic indicator, yielding second search results, the second geographic indicator describing a second geographic region;
  in response to determining that a number of the second search results is less than the threshold number, determining a second likelihood value indicating a likelihood that users in the second geographic region would expand the second geographic indicator in an expanded search of the second search query;
  in response to determining that the likelihood value exceeds the threshold likelihood value, determining to expand the second geographic indicator for the expanded search of the second search query; and
  executing the expanded search of the second search query based on the second search term and an expanded geographic indicator, yielding second expanded search results, the expanded geographic indicator describing a third geographic region that encompasses the second geographic region.

20. The non-transitory computer-readable medium of claim 19, wherein determining the second likelihood value comprises:
  using the second geographic region as input into the statistical model generated from the historical search logs, the statistical model outputting the second likelihood value based on receiving the second geographic region as input.

* * * * *